(12) United States Patent
Yasman et al.

(10) Patent No.: US 10,986,044 B2
(45) Date of Patent: Apr. 20, 2021

(54) LOW LATENCY DATA SYNCHRONIZATION

(71) Applicant: INTEL CORPORATION, Santa Clara, CA (US)

(72) Inventors: Eugene Yasman, Pardes Hanna (IL); Liron Ain-Kedem, Kiryat Tivon (IL)

(73) Assignee: Intel Corporation, Santa Clara, CA (US)

( * ) Notice: Subject to any disclaimer, the term of this patent is extended or adjusted under 35 U.S.C. 154(b) by 176 days.

(21) Appl. No.: 16/145,637

(22) Filed: Sep. 28, 2018

(65) Prior Publication Data

US 2019/0044891 A1 Feb. 7, 2019

(51) Int. Cl.
*G06F 15/16* (2006.01)
*H04L 12/879* (2013.01)
*G06F 9/50* (2006.01)
*H04L 12/26* (2006.01)
*H04L 29/06* (2006.01)
*H04L 12/861* (2013.01)
*H04W 84/18* (2009.01)

(52) U.S. Cl.
CPC .......... *H04L 49/901* (2013.01); *G06F 9/5016* (2013.01); *H04L 43/087* (2013.01); *H04L 49/9078* (2013.01); *H04L 65/601* (2013.01); *H04L 65/602* (2013.01); *H04L 65/80* (2013.01); *H04L 49/9052* (2013.01); *H04W 84/18* (2013.01)

(58) Field of Classification Search
CPC ... H04L 49/901; H04L 43/087; H04L 65/601; H04L 49/9078; H04L 49/9052; G06F 9/5016
See application file for complete search history.

(56) References Cited

U.S. PATENT DOCUMENTS

| 10,511,509 | B2 | 12/2019 | Yasman et al. |
| 2003/0182464 | A1 | 9/2003 | Hamilton et al. |
| 2004/0034640 | A1 | 2/2004 | Jain et al. |
| 2012/0188392 | A1* | 7/2012 | Smith ................. H04N 5/2355 348/222.1 |
| 2018/0295039 | A1 | 10/2018 | Yasman et al. |

* cited by examiner

*Primary Examiner* — Cheikh T Ndiaye
(74) *Attorney, Agent, or Firm* — Schwegman Lundberg & Woessner, P.A.

(57) ABSTRACT

In some examples, a computing device for processing data streams includes storage to store instructions and a processor to execute the instructions. The processor is to execute the instructions to receive respective data streams provided from a plurality of data producer sensors. The processor is also to execute the instructions to stagger a time of triggering of a first of the plurality of data producer sensors relative to a time of triggering of a second of the plurality of data producer sensors to minimize a concurrency of data frames of the data stream received from the first data producer sensor and data frames of the data stream received from the second of the plurality of data producer sensors. The processor is also to execute the instructions to process the data streams from the plurality of data producer sensors in a time-shared manner. The processor is also to execute the instructions to provide the processed data streams to one or more consumer of the processed data streams.

23 Claims, 12 Drawing Sheets

400

500

LOW LATENCY DATA SYNCHRONIZATION

RELATED APPLICATION

This application is related to U.S. patent application Ser. No. 15/481,708, filed on Apr. 7, 2017 and entitled "Technologies for Jitter-Adaptive Low-Latency, Low Power Data Streaming Between Device Components", issued Dec. 17, 2019 as U.S. Pat. No. 10,511,509.

TECHNICAL FIELD

This disclosure relates generally to low latency data synchronization and processing.

BACKGROUND

Typical computing devices include multiple internal components that exchange data. For example, a typical processor may include multiple functional blocks such as image signal processors (ISPs), display engines, and/or media encoders that exchange data. In applications with multiple data streams (for example, multi-camera environments), the amount of sensors (for example, cameras) can exceed the number of processing pipes, since adding more pipe increases the area and cost of the solution.

BRIEF DESCRIPTION OF THE DRAWINGS

The following detailed description may be better understood by referencing the accompanying drawings, which contain specific examples of numerous features of the disclosed subject matter.

In some cases, the same numbers are used throughout the disclosure and the figures to reference like components and features. In some cases, numbers in the 100 series refer to features originally found in FIG. 1; numbers in the 200 series refer to features originally found in FIG. 2; and so on.

DETAILED DESCRIPTION

Typical computing devices include multiple internal components that exchange data. For example, a typical processor may include multiple functional blocks such as image signal processors (ISPs), display engines, and/or media encoders that exchange data. In applications with multiple data streams (for example, multi-camera environments), the amount of sensors (for example, cameras) can exceed the number of processing pipes, since adding more pipe increases the area and cost of the solution. In some embodiments, time sharing of limited processing resources is implemented between different data streams. In some embodiments, time shared data stream processing (for example, image stream processing) is implemented for multiple inbound streams with a concurrent time-overlap implementation using local and remote memories.

In some embodiments, a centralized system with time sharing resources can be used to achieve deterministic low latency by coordinating producers of data (for example, sensors) to consumers of data (for example, one or more displays and/or media). Minimum latency may be obtained for both the processing of the data as well as a display of the data, even during concurrent streaming of data from a plurality of data producers. In some embodiments, system memory bandwidth can be optimized and power can be saved through use of local (or internal) memory with remote (or external or system) memory.

In some embodiments, sensor triggering (for example, image sensor triggering using a triggering controller) is staggered in time between data streams. In some embodiments, minimization of input concurrency of data streams may be implemented using controlled sensor triggering, for example. Reducing or minimizing the concurrency can help minimize latency and save bandwidth and power.

In some embodiments, sensor read-out times (and/or vertical blanking intervals) are adjusted. In some embodiments, data streams are dynamically routed between local (for example, internal) memory and remote (for example, external) memory. Some embodiments include staggering sensor exposure triggering, read-out time reduction, and/or dynamic data routing via internal (local) and/or external (remote) memory during a sensor frame transfer. In some embodiments, minimization of input concurrency of data streams may be implemented using controlled sensor triggering, reducing read-out time of frames of data streams, and/or dynamic data routing, for example.

Figure 1:
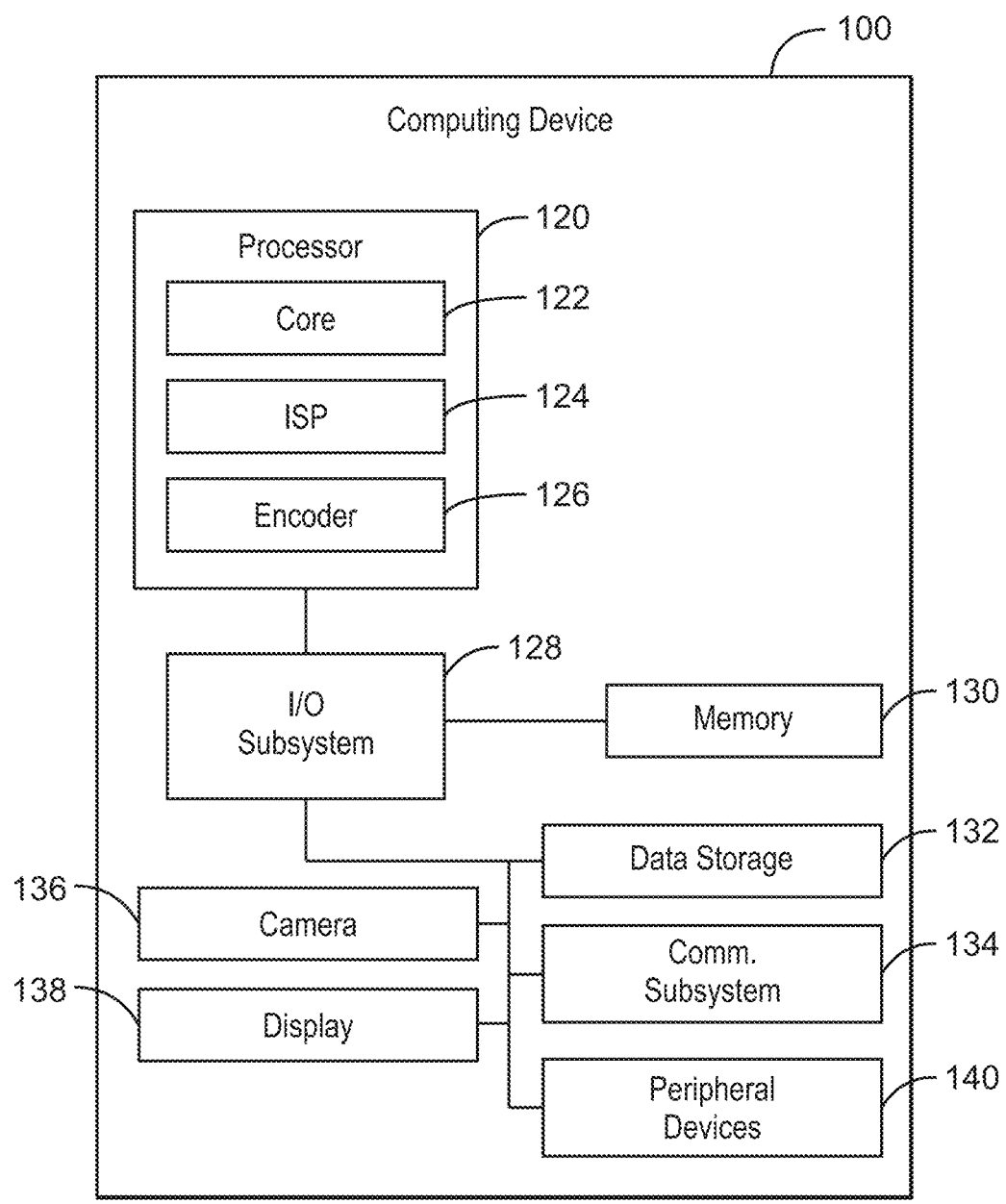
FIG. 1 illustrates a system in accordance with some embodiments.

Referring now to FIG. 1, an illustrative computing device 100 for low-latency data streaming is shown. In use, as described below, the computing device 100 includes a producer component and a consumer component, which may be embodied as functional blocks, semiconductor intellectual property (IP) cores, or other components of a processor. Both the producer and the consumer initially communicate data using a local buffer, which may be accessed using low power consumption. If the local buffer fills, then the producer can switch to a remote buffer, which may require higher power consumption but may include a larger data capacity. The consumer continues to process data in the order it was produced (e.g., in raster order), and when all data in the local buffer is processed, the consumer can switch to the remote buffer. When the amount of data in the remote buffer is reduced below a predetermined threshold, the producer can switch back to adding data to the local buffer. In some embodiments, when the local buffer exceeds a predetermined high threshold, the consumer and/or the producer may switch to a catch-up mode to reduce the gap between the rate of production and the rate of consumption. When the producer and the consumer are both operating on the local buffer and the local buffer is below the high threshold, the producer and/or the consumer may exit the catch-up mode. Thus, the computing device 100 may dynamically adapt to varying amounts of jitter by switching between local and remote buffers, without dropping data or requiring the producer and consumer to switch between different modes of operation (i.e., without switching from raster data streaming to frame-based transfer).

By using the local buffer when possible (e.g., when jitter is low and manageable by the local buffer), the computing device 100 may reduce system/external memory bandwidth and power consumption and/or latency as compared to systems that exclusively use large remote buffers, while still maintaining the capability to manage varying amounts of jitter. Additionally, the computing device 100 may dynamically adjust the rate of production and/or consumption, which may further improve power consumption. Further, the computing device 100 may manage jitter without introducing backpressure or producer stalling, and thus may be usable with producers that are incapable of stalling or otherwise reducing the rate of production (e.g., real-time producers such as image sensors, image signal processors, and/or display engines). Also, the computing device 100 may be scaled to different memory types and/or buffer sizes based on jitter, latency, power, and/or footprint considerations.

The computing device 100 may be embodied as any type of device capable of performing the functions described herein. For example, the computing device 100 may be embodied as, without limitation, a computer, a laptop computer, a tablet computer, a notebook computer, a mobile computing device, a smartphone, a wearable computing device, a multiprocessor system, a server, a workstation, and/or a consumer electronic device. As shown in FIG. 1, the illustrative computing device 100 includes a processor 120, an I/O subsystem 128, a memory 130, and a data storage device 132. Additionally, in some embodiments, one or more of the illustrative components may be incorporated in, or otherwise form a portion of, another component. For example, the memory 130, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. As the processor 120 illustratively includes a processor core 122, an image signal processor (ISP) 124, and a media encoder 126. The processor core 122 is an independent, general-purpose processing unit capable of executing programmed instructions. For example, the processor core 122 may execute instructions from a general-purpose instruction set architecture (ISA) such as IA-32 or Intel® 64. The illustrative processor 120 is a single-core processor 120 having one processor core 122; however, it should be understood that in other embodiments the processor 120 may be embodied as a multi-core or multi-threaded processor, digital signal processor, microcontroller, or other processor or processing/controlling circuit with multiple processor cores or other independent processing units.

The image signal processor (ISP) 124 may be embodied as any logic, co-processor, integrated circuit, or other circuitry capable of processing two-dimensional or three-dimensional image data or video data captured by one or more image sensors (for example, one or more image sensors of the computing device 100, and/or one or more image sensors that are separate from the computing device 100). Similarly, the media encoder 126 may be embodied as any logic, co-processor, integrated circuit, or other circuitry capable of media processing such as accelerated video encoding and/or accelerated video decoding. Each of the ISP 124 and the media encoder 126 may be embodied as a separate functional block, IP core, or other component of the processor 120 and thus may be included on the same integrated circuit chip and/or in the same package as the processor core 122 and other subcomponents of the processor 120. In some embodiments, the ISP 124 and/or the media encoder 126 may be included in a processor graphics, graphics processing unit, or other graphics processor.

The memory 130 may be embodied as any type of volatile or non-volatile memory or data storage capable of performing the functions described herein. In operation, the memory 130 may store various data and software used during operation of the computing device 100 such operating systems, applications, programs, libraries, and drivers. The memory 130 is communicatively coupled to the processor 120 via the I/O subsystem 128, which may be embodied as circuitry and/or components to facilitate input/output operations with the processor 120, the memory 130, and other components of the computing device 100. For example, the I/O subsystem 128 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. In some embodiments, the memory 130 may be directly coupled to the processor 120, for example via an integrated memory controller hub. Additionally, in some embodiments, the I/O subsystem 128 may form a portion of a system-on-a-chip (SoC) and be incorporated, along with the processor 120, the memory 130, and other components of the computing device 100, on a single integrated circuit chip.

The data storage device 132 may be embodied as any type of device or devices configured for short-term or long-term storage of data such as, for example, memory devices and circuits, memory cards, hard disk drives, solid-state drives, non-volatile flash memory, or other data storage devices. The computing device 100 may also include a communications subsystem 134, which may be embodied as any communication circuit, device, or collection thereof, capable of enabling communications between the computing device 100 and other remote devices over a computer network (not shown). The communications subsystem 134 may be configured to use any one or more communication technology (e.g., wired or wireless communications) and associated protocols (e.g., Ethernet, Bluetooth®, Wi-Fi®, WiMAX, 3G, 4G, LTE, etc.) to effect such communication.

The computing device 100 further includes a camera 136 and a display 138. The camera 136 may be embodied as a digital camera or other digital imaging device integrated with the computing device 100 or otherwise communicatively coupled thereto. The camera 136 includes an electronic image sensor, such as an active-pixel sensor (APS), e.g., a complementary metal-oxide-semiconductor (CMOS) sensor, or a charge-coupled device (CCD). The camera 136 may be communicatively coupled with the ISP 124, which may process data received from the camera 136. The display 138 may be embodied as any type of display capable of displaying digital information, such as a liquid crystal display (LCD), a light emitting diode (LED), a plasma display, a cathode ray tube (CRT), or other type of display device. The display 138 may include or otherwise be coupled to a display engine, which may be embodied as any logic, co-processor, integrated circuit, functional block, IP core, or other circuitry capable of generating image data for display by the display 138.

As shown, the computing device 100 may further include one or more peripheral devices 140. The peripheral devices 140 may include any number of additional input/output devices, interface devices, and/or other peripheral devices. For example, in some embodiments, the peripheral devices 140 may include a display, touch screen, graphics circuitry, keyboard, mouse, speaker system, microphone, network interface, and/or other input/output devices, interface devices, and/or peripheral devices.

Figure 2:
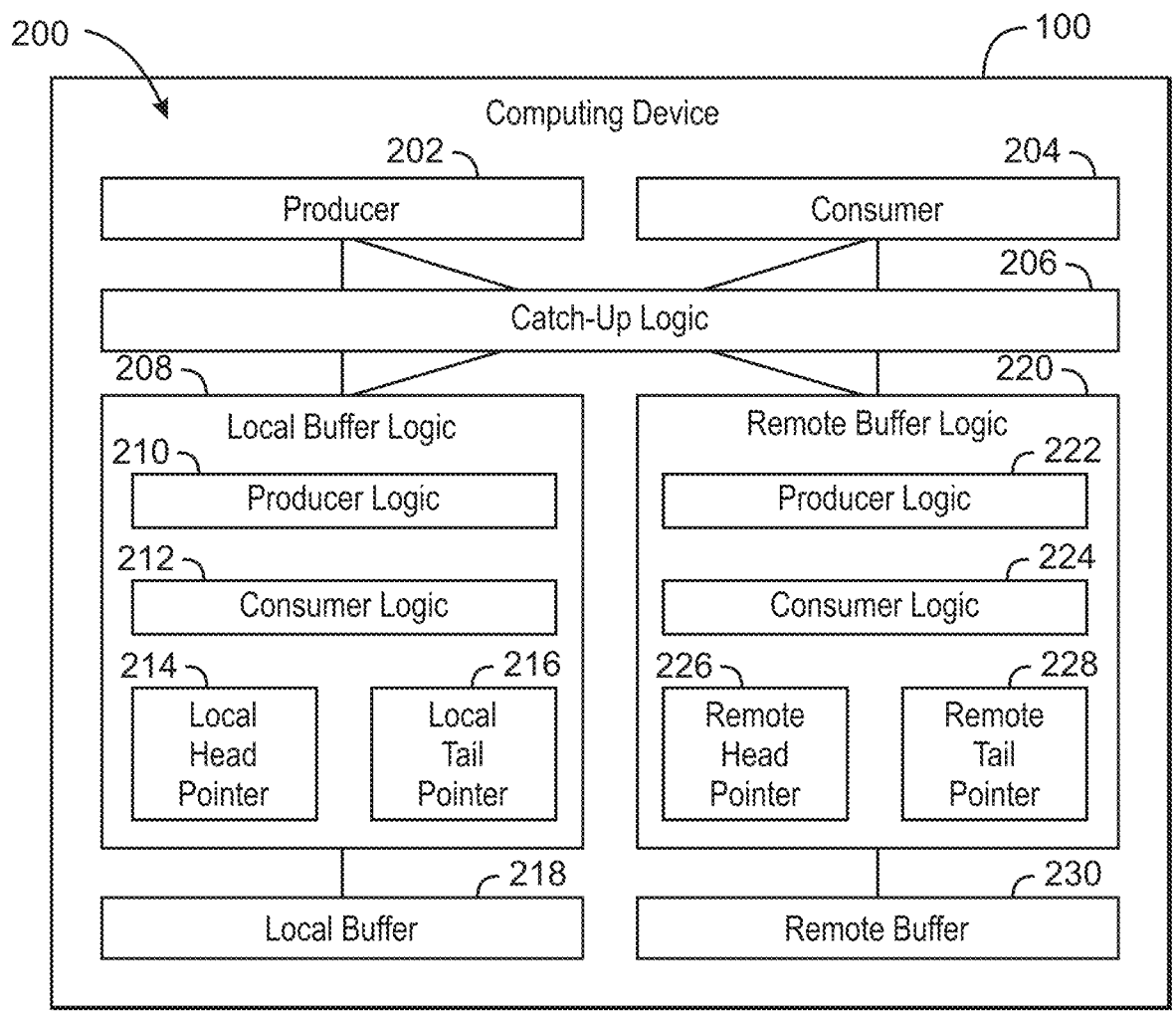
FIG. 2 illustrates a system in accordance with some embodiments.

Referring now to FIG. 2, in an illustrative embodiment, the computing device 100 establishes an environment 200 during operation. The illustrative environment 200 includes a producer 202, a consumer 204, a catch-up logic 206, a local buffer logic 208, and a remote buffer logic 220. The various components of the environment 200 may be embodied as hardware, firmware, software, or a combination thereof. As such, in some embodiments, one or more of the components of the environment 200 may be embodied as circuitry or collection of electrical devices (e.g., producer circuitry 202, consumer circuitry 204, catch-up logic circuitry 206, local buffer logic circuitry 208, and/or remote buffer logic circuitry 220). It should be appreciated that, in such embodiments, one or more of the producer circuitry 202, the consumer circuitry 204, the catch-up logic circuitry 206, the local buffer logic circuitry 208, and/or the remote buffer logic circuitry 220 may form a portion of the processor 120, the I/O subsystem 128, and/or other components of the computing device 100. Additionally, in some embodiments, one or more of the illustrative components may form a portion of another component and/or one or more of the illustrative components may be independent of one another.

The producer 202 is configured to generate one or more data items. The producer 202 may operate in a local buffer producer mode or a remote buffer producer mode. In the local buffer producer mode, the producer 202 is configured to add the data items to a local buffer 218, and in the remote buffer producer mode, the producer 202 is configured to add the data items to a remote buffer 230. The producer 202 may be embodied as a functional block, IP core, or other component of the processor 120. For example, the producer 202 may be embodied as the image signal processor 124 or a display engine of the computing device 100.

The consumer 204 is configured to determine whether any data items are available in the local buffer 218 or the remote buffer 230. The consumer 204 may operate in a local buffer consumer mode or a remote buffer consumer mode. In the local buffer consumer mode, the consumer 204 is configured to read data items from the local buffer 218, and in the remote buffer consumer mode, the consumer 204 is configured to read data items from the remote buffer 230. Similar to the producer 202, the consumer 204 may be embodied as a functional block, IP core, or other component of the processor 120. For example, the consumer 204 may be embodied as the media encoder 126. Illustratively, the media encoder 126 may read data from the ISP 124 and then encode video data. As another illustration, the media encoder 126 may read data from a display engine and then encode video data, for example to perform display casting (e.g., for Intel® Wireless Display or Miracast™).

The catch-up logic 206 is configured to determine whether the local buffer 218 is above a high threshold in response to generating a data item. The producer 202 and/or the consumer 204 may be configured to switch to a catch-up operating mode in response to determining that the local buffer 218 is above the high threshold. The catch-up logic 206 is further configured to determine, if the local buffer 218 is not above the high threshold, whether the remote buffer 230 is also empty. The producer 202 and/or the consumer 204 may be further configured to switch to a normal operating mode in response to determining that the remote buffer 230 is empty.

The local buffer logic 208 is configured to determine whether the local buffer 218 is full in response to generating the data item while operating in the local buffer producer mode and, if full, to switch to the remote buffer producer mode. The local buffer logic 208 is further configured to determine whether the local buffer 218 is empty in response to determining that a data item is available while operating in the local buffer consumer mode and, if empty, to switch to the remote buffer consumer mode. In some embodiments, those functions may be performed by one or more sub-components, such as a producer logic 210 and/or a consumer logic 212.

The local buffer 218 may be embodied as any ring buffer or other cyclic memory buffer that is accessible by both the producer 202 and the consumer 204 with lower required power consumption as compared to accessing the remote buffer 230. For example, the local buffer 218 may be embodied as a local memory or a cache of the processor 120. The producer 202 may add data to the local buffer 218 at a position indicated by a local head pointer 214 and increment the local head pointer 214. The consumer 204 may read data from the local buffer 218 at a position indicated by a local tail pointer 216 and increment the local tail pointer 216. Both the local head pointer 214 and the local tail pointer 216 may be accessible to the producer 202 and the consumer 204.

The remote buffer logic 220 is configured to determine whether the remote buffer 230 is below a low threshold in response to generating a data item while operating in the remote buffer producer mode and, if below the low threshold, to switch to the local buffer producer mode. The remote buffer logic 220 is further configured to determine whether the remote buffer 230 is empty in response to determining that a data item is available while operating in the remote buffer consumer mode and, if empty, to switch to the local buffer consumer mode. In some embodiments, those functions may be performed by one or more sub-components, such as a producer logic 222 and/or a consumer logic 224.

The remote buffer 230 may be embodied as any ring buffer or other cyclic memory buffer that is accessible by both the producer 202 and the consumer 204. Accessing the remote buffer 230 may require higher power consumption as compared to accessing the local buffer 218. However, the remote buffer 230 may have a larger capacity to handle a larger amount of jitter (e.g., enough capacity to store one or more video frames or partial video frames). For example, the remote buffer 230 may be embodied as or otherwise included in the system memory 130 of the computing device 100. The producer 202 may add data to the remote buffer 230 at a position indicated by a remote head pointer 226 and increment the remote head pointer 226. The consumer 204 may read data from the remote buffer 230 at a position indicated by a remote tail pointer 228 and increment the remote tail pointer 228. Both the remote head pointer 226 and the remote tail pointer 228 may be accessible to the producer 202 and the consumer 204. Additionally or alternatively, although illustrated as a cyclic buffer, it should be understood that in some embodiments the remote buffer 230 may be embodied as a non-cyclic buffer, such as a buffer used to transfer frames between a producer and a consumer in queue/de-queue buffer rotation manner.

Although illustrated as including a single producer 202 and consumer 204, it should be understood that the computing device 100 may include many producers 202 and/or consumers 204. In some embodiments, the computing device 100 may include localized flow control for a dedicated producer-consumer pair (e.g., a dedicated local buffer logic 208 and remote buffer logic 220). Additionally or alternatively, in some embodiments the computing device 100 may include shared centralized memory access logic to serve many different producer-consumer connections (e.g., a centralized local buffer logic 208 and remote buffer logic 220). Additionally or alternatively, in some embodiments certain functions of the producer 202 and/or consumer 204 may be performed by dedicated and/or centralized producer logic and/or consumer logic that is transparent to the underlying producer 202 and/or consumer 204, respectively. For example, the data streaming and/or catch-up logic as described above may be performed by remapping memory accesses performed by the producer 202 and/or consumer 204 and/or by redirecting corresponding memory traffic.

Figure 3:
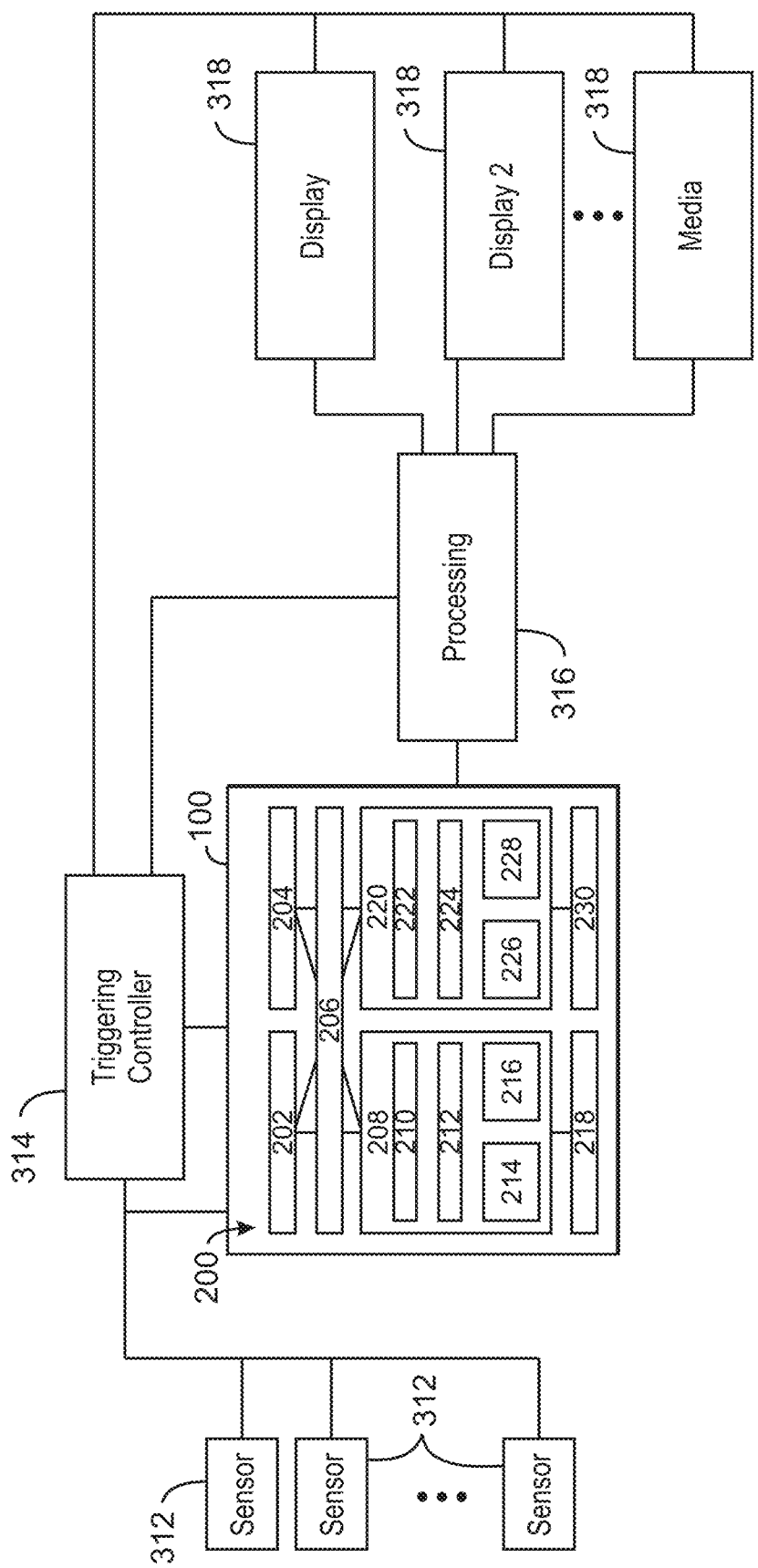
FIG. 3 illustrates a system in accordance with some embodiments.

FIG. 3 illustrates a system 300 in accordance with some embodiments. System 300 includes a computing device 100, which can be the same as the computing device 100 illustrated in and described in reference to FIG. 1 and/or FIG. 2. In some embodiments, system 300 is a time shared data processing system (for example, a time shared image processing system) with multiple inputs (producers of data or data frames, such as image frame data, for example) and multiple outputs (consumers of data or data frames, such as image frame data, for example). In some embodiments, system 300 is a low latency data synchronization system. In some embodiments, system 300 can synchronize multiple data inputs in a low latency time shared system while optimizing bandwidth. In some embodiments, concurrency can be reduced and/or minimized by staggering triggering of sensors providing the data streams. Reducing and/or minimizing the concurrency can help minimize latency and save bandwidth and power. In some embodiments, system 300 is a time-shared image signal processing system able to process multiple concurrent sensor streams (for example, multiple concurrent image sensor streams) from input to display. In some embodiments, system 300 can implement time-shared video encoding of multiple concurrent sensor streams. In some embodiments, system 300 is a concurrent multi-sensor system (for example, multi-camera system) with tight low-latency requirements. For example, in some embodiments, system 300 can be included in an automotive, advanced driver assistance system (ADAS), a drone system, an IoT system, and/or a converged mobility system using time-shared processing. System 300 can be used to optimize system memory bandwidth and associated power, while meeting tight low-latency time-shared processing requirements.

System 300 includes a plurality of sensors 312. Sensors 312 can be producers of data (for example, image data) and/or can be camera sensors. In some embodiments, sensors 312 provide data streams (for example, image data streams). System 300 also includes a triggering controller 314, processor 316 (for example, an image processor that can process image data), and a plurality of devices 318. In some embodiments, triggering controller 314 can stagger triggering of sensors 312. This can reduce and/or minimize data concurrency of different streams produced by the sensors 312. In some embodiments, trigger controller 314 can be, for example, a camera trigger that triggers one or more of cameras 312. In some embodiments, triggering controller 314 can trigger multiple sensors 312. The multiple sensors 312 can be triggered by triggering controller 314 at different times in accordance with some embodiments, for example. This can be implemented to minimize concurrency of data streams from various sensors 312.

In various embodiments, triggering controller 314 can be implemented in hardware, software, and/or firmware. In some embodiments, triggering controller 314 can trigger multiple sensors (for example, multiple image sensors). In some embodiments, triggering controller 314 can be a trigger that causes one or more of sensors 312 to start a measurement cycle. Triggering controller 314 can implement time based triggering used to generate fixed-frequency triggers at a user-defined rate. Triggering controller 314 can implement time based triggering for multiple sensors 312 at staggered times to minimize concurrency of data streams, for example. Triggering controller 314 can provide a different trigger input (for example, at a different staggered time) to each of the sensors 312. In some embodiments, the triggering controller 314 can be hardware based. However, in some embodiments, triggering controller 314 can use a software trigger generated by a software application running over a sensor network to start staggered measurement cycles, for example In some embodiments, triggering controller 314 can be an external trigger that can provide greater timing accuracy of the sensors 312. For example, in embodiments in which one or more sensors 312 are cameras, external triggering from triggering controller 314 can provide timing accuracy, direct control over exposure duration, and/or control over read-out times. Sensors 312 may include a high density connector that can provide input signals such as an input trigger signal to the sensor. In embodiments in which the sensors 312 are cameras, software or hardware signals can be provided from triggering controller 314 to tell each camera 312 when to snap an image. Such a top level control signal can be converted into camera-specific commands within the cameras 312 via a device driver of the camera. Sensor commands can be fed through such a sensor input (for example, a sensor input pin such as a dedicated trigger input pin) on each sensor 312 and fed through a control card, USB port, or other port such as a wireless communication port on the sensor 312. Once triggering of one of the sensors 312 has occurred, the sensor can send data streams in response to the triggering input back to the triggering controller or the computing device 100, for example.

In some embodiments, processor 316 is not necessary and processing (for example, data stream processing such as image processing) can be implemented by computing device 100, for example. Devices 318 can include consumers of data (for example, image data) and/or can be one or more displays and/or one or more media encoding devices, for example. Sensors 312 can be coordinated to the devices 318 using image processing occurring within the sensors 312, the triggering controller 314, the computing device 100, and/or the processor 316. In some embodiments, the coordination of the sensors 312 to the devices 318 can be implemented using image processing between the sensors 312 and the devices 318 (for example, image processing implemented in the computing device 100, the triggering controller 314, and/or the processor 316. The image processing coordination can result in minimum latency according to some embodiments. In some embodiments, triggering controller 314 can obtain information, such as, for example, information from various consumers 318 (for example, from displays 318 and/or media encoding 318, etc.), their timing (for example, VSYNC), sensor latency requirements of sensors 312, processing speed per sensor, etc., and can adjust triggering of the sensors 312 for latency and/or bandwidth optimization, for example. In some embodiments, triggering controller 314 can stagger triggering of the sensors 312 so that concurrency of data streams provided from different sensors 312 can be reduced and/or minimized. Reducing or minimizing the concurrency can help minimize latency and save bandwidth and power.

It is noted that in multi-data producer applications (for example, multi-sensor applications such as multi-camera applications and/or in system 300), for example, the amount of data producers (for example, the amount of cameras or image sensors) can exceed the number of processing pipes, since adding more processing pipe increases the area and the cost. In some embodiments, time-sharing of the limited processing resources can be implemented between the various and multiple data streams (for example, image streams, sensor streams, and/or camera streams). However, time sharing may not always guarantee meeting particular low-latency targets (for example, photon-to-photon from sensor to display). In some situations, target latency between each of the sensor data stream outputs and its processed/displayed output must be sustainably met for multiple concurrent streams.

In order to achieve lowest latency targets, processing can start in accordance with some embodiments even before the last pixel is produced by the sensor device (for example, image sensor and/or camera). However, limited processing resources may become fully occupied for longer periods of time, which can prevent other sensor streams (for example, image streams and/or camera streams) from meeting latency requirements. Further, time-sharing may require intermediate storing of unprocessed sensor stream data when processing resources become fully occupied. This can increase the system memory bandwidth, which can become a major performance limiting factor.

In some embodiments (for example, in some system 300 embodiments), end-to-end latency and total system memory bandwidth may be optimized for time-shared multi-sensor processing systems (for example, multi-camera processing systems). In some embodiments, aggressively low latency is allowed for multiple concurrent streams and system memory bandwidth is optimized. For example, in some embodiments, controlled image sensor exposure triggering (which can result in minimizing concurrency of data streams and help minimize latency and save bandwidth and power), read-out time adjustments, and data routing can be implemented to allow a balance between local memory (for example, a local buffer and/or an internal buffer) and remote memory (for example, a remote buffer, external buffer, and/or external system memory). In some embodiments, concurrency can be minimized (for example, in order to save bandwidth, or low latency can be achieved (for example, for processing and/or consumption such as display or media encoding consumption), or both low latency and concurrency/low bandwidth under low latency system requirements can be optimized.

Triggering controller 314 can stagger triggering of sensor exposure of one or more (or all) of sensors 312. This staggered triggering can result in minimization of concurrency of data streams from the sensors 312. Reducing or minimizing the concurrency can help minimize latency and save bandwidth and power. In some embodiments, concurrency is minimized as much as possible. Although minimizing the concurrency may be limited by various factors such as vertical blanking interval (VBLANK) limitations and minimal sensor read-out times, for example, concurrency minimization can be implemented in accordance with some embodiments while keeping such limiting factors in mind.

Sensors 312, triggering controller 314, computing device 100, and/or processor 316 can reduce read-out time for data frames (for example, image frames) from one or more of the sensors 312. Sensors 312, triggering controller 314, computing device 100, and/or processor 316 can also dynamically route data during a data frame transfer using internal (local) and external (remote) memory (for example, using local buffer 218 and/or remote buffer 230).

Figure 4:
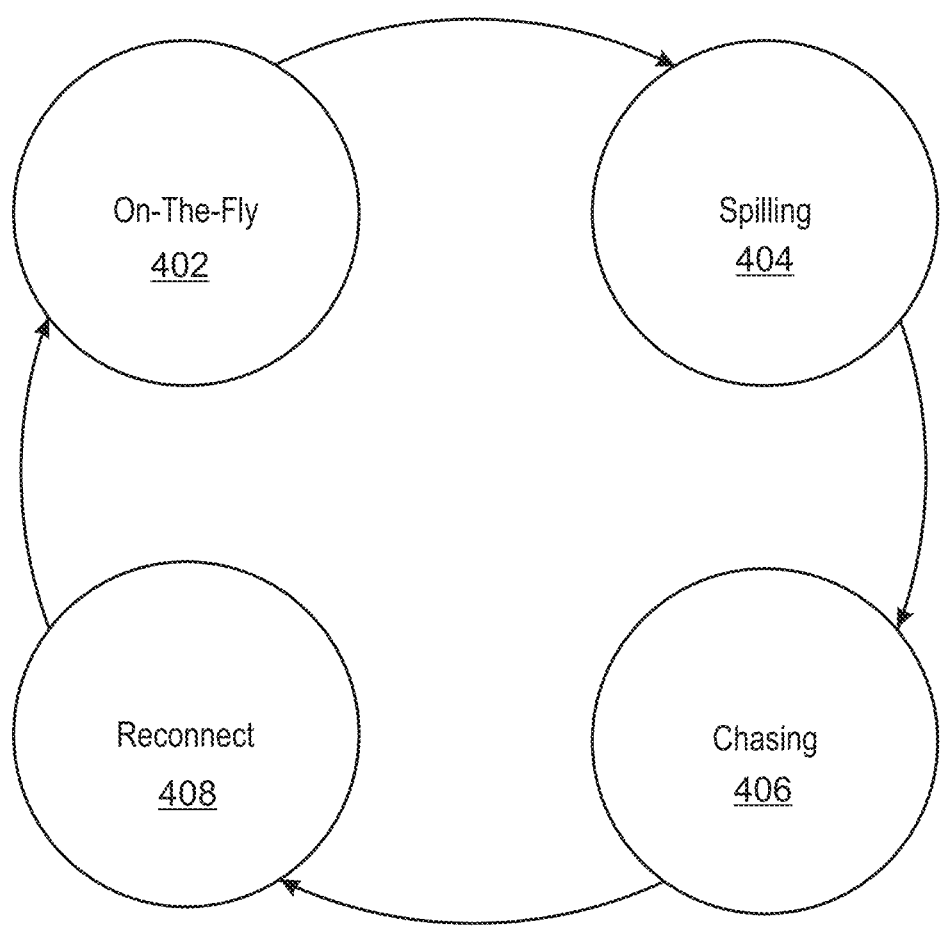
FIG. 4 illustrates flow state transition during frame transfer in accordance with some embodiments.

FIG. 4 illustrates flow state transition 400 during data transfer (for example, during data frame transfer and/or image frame transfer) in accordance with some embodiments. Flow 400 can be implemented, for example, using system 300, computing device 100, sensors 312, triggering controller 314, and/or processor 316. Flow 400 includes an on-the-fly state 402, a spilling state 404, a chasing state 406, and a reconnect state 408. In some embodiments, flow 400 is a state machine including on-the-fly state 402, spilling state 404, chasing state 406, and reconnect state 408.

On-the-fly 402 is a state of data flow in which read and write pointers both index an internal (or local) memory buffer (for example, both read and write pointers access local buffer 218 in some embodiments). This can help save an external (or remote) memory buffer bandwidth and power (for example, can help save remote buffer 230, external system memory, remote system memory, and/or double data rate system memory bandwidth and power).

Spilling 404 is a state of data flow in which a write pointer indexes an external (or remote) memory buffer (for example, indexes remote buffer 230, an external system memory, a remote system memory, and/or a double data rate system memory), and a read pointer indexes an internal (or local) memory buffer (for example, local buffer 218 in some embodiments).

Chasing 406 is a state of data flow in which read and write pointers both index an external (or remote) memory buffer (for example, both index remote buffer 230, an external system memory, a remote system memory, and/or a double data rate system memory).

Reconnect 408 is a state of data flow in which a write pointer indexes an internal (or local) memory buffer (for example, local buffer 218 in some embodiments), and a read pointer indexes an external (or remote) memory buffer (for example, indexes remote buffer 230, an external system memory, a remote system memory and/or a double data rate system memory).

In some embodiments, the read pointer never underruns the write pointer. In some embodiments, the write pointer never overruns the read pointer.

Figure 5:
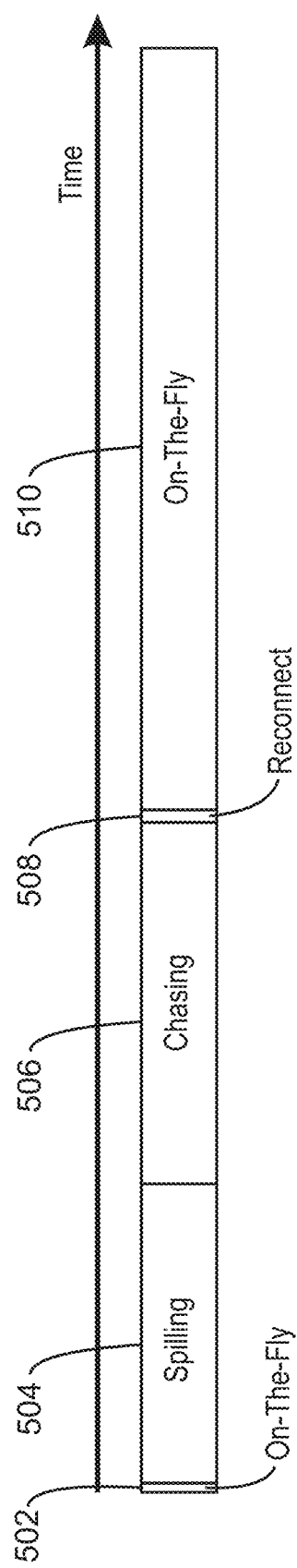
FIG. 5 illustrates flow state transition during frame transfer in accordance with some embodiments.

FIG. 5 illustrates flow state transition 500 during data transfer (for example, during data frame transfer and/or image frame transfer) in accordance with some embodiments. In some embodiments, flow 500 illustrates a data stream 500 (for example, an image stream). In some embodiments, flow 500 implements a similar or same flow state transition as flow 400. Flow 500 can be implemented, for example, using system 300, computing device 100, sensors 312, triggering controller 314, and/or processor 316. Flow 500 includes on-the-fly flow 502, a spilling flow 504, a chasing flow 506, a reconnect flow 508, and an on-the-fly flow 510.

In some embodiments flow state transition 500 illustrates flow state transition during a frame transfer in a time-sharing system (for example, in system 300). Data flow can be implemented on-the fly (OTF) at box 502, for example, until read and write pointers can no longer both index an internal (or local) memory buffer. Flow then moves to spilling flow 504, during which the write pointer indexes an external (or remote) memory buffer and the read pointer indexes the internal (or local) memory buffer. During chasing flow 506 the read and write pointers both index the external (or remote) memory buffer. During reconnect flow (508), which can be a fast reconnect flow, the write pointer indexes the internal (or local) memory buffer while the read pointer indexes the external (or remote) memory buffer. Flow state transition 500 can illustrate an example during data frame transfer in a time-sharing system in which, after chasing flow 506, a fast reconnect flow 508 transitions back to an on-the-fly flow 510, which can allow for bandwidth savings even in time-shared multi-stream implementations.

Figure 6:
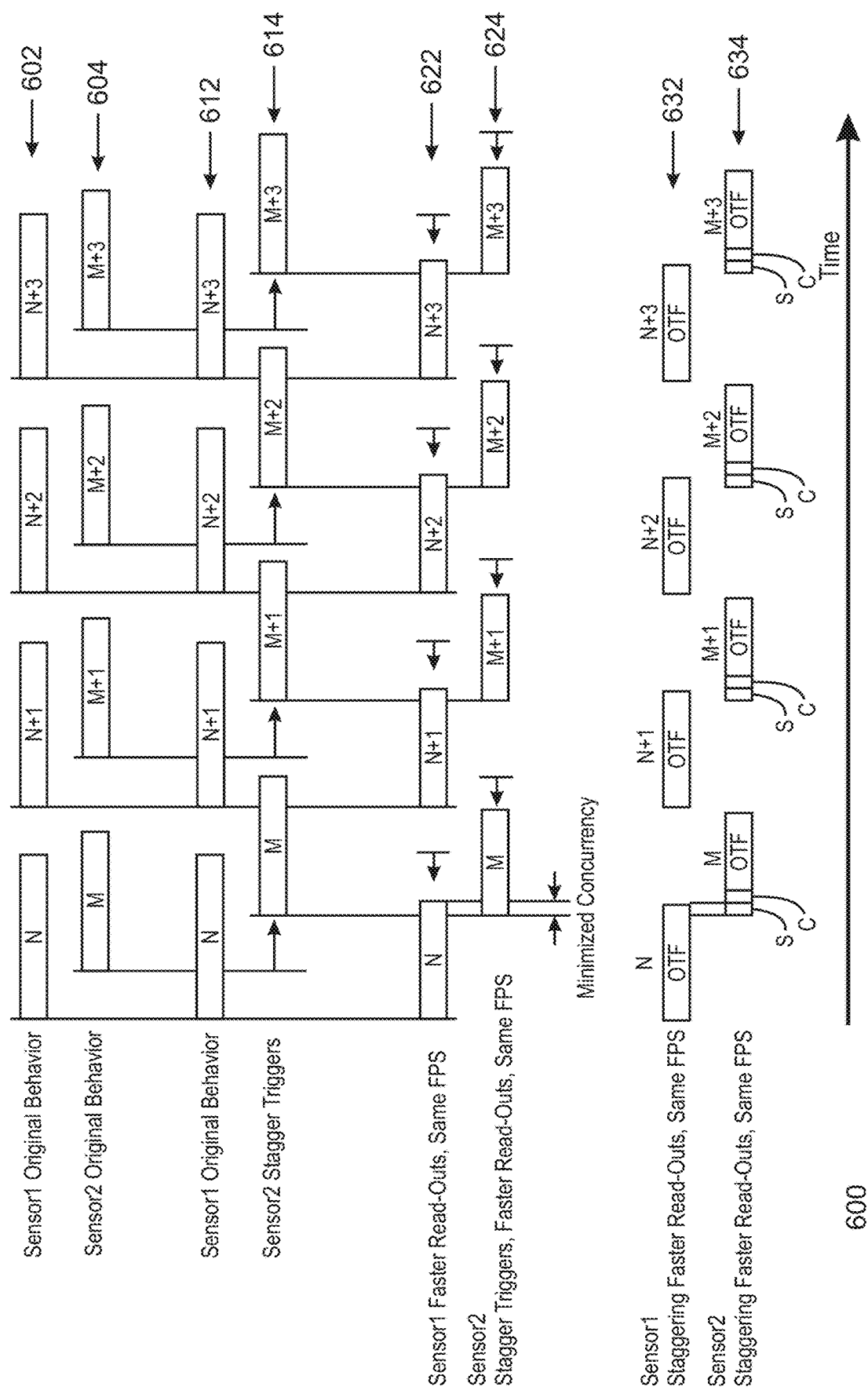
FIG. 6 illustrates flow state transition during frame transfer in accordance with some embodiments.

FIG. 6 illustrates flow state transition 600 during data transfer (for example, during data frame transfer and/or image frame transfer) in accordance with some embodiments. In some embodiments, flow 600 implements a same or similar flow state transition as flow 400 and/or flow 500. Flow 600 can be implemented, for example, using system 300, computing device 100, sensors 312, triggering controller 314, and/or processor 316. It is noted that FIG. 6 illustrates an example with two sensors, but in some embodiments, any number of sensors may be providing data streams.

Flow diagram 600 includes frames (or a data stream) 602, including frames N, N+1, N+2, and N+3, of original frame behavior of a first sensor (Sensor1), which can be a first sensor included in sensors 312, for example. Flow diagram 600 also includes frames (or a data stream) 604, including frames M, M+1, M+2, and M+3, of original frame behavior of a second sensor (Sensor2), which can be a second sensor included in sensors 312, for example. In some embodiments, the original behavior of streams 602 and 604 is a result of non-synchronized sensors.

Flow diagram 600 includes frames (or a data stream) 612, including frames N, N+1, N+2, and N+3, of original frame behavior of the first sensor (Sensor1), which can be a first sensor included in sensors 312, for example. Flow diagram 600 also includes frames (or a data stream), including frames M, M+1, M+2, and M+3, with synchronized and/or triggered staggering of original frame behavior of the second sensor (Sensor2), which can be a second sensor included in sensors 312, for example.

Flow diagram 600 includes frames (or a data stream) 622, including frames N, N+1, N+2, and N+3, of original frame behavior of the first sensor (Sensor1), with faster read-outs and a same frames per second (FPS) as frames 602 or 612, for example. Flow diagram 600 also includes frames (or a data stream) 624, including frames M, M+1, M+2, and M+3, with synchronized and/or triggered staggering of original frame behavior of the second sensor (Sensor2), and with faster read-outs and a same frames per second (FPS) as frames 614, for example. Staggering triggering of sensor exposure and/or faster read-outs can help to minimize concurrency of the frames 622 and 624, as illustrated in FIG. 6. Reducing or minimizing the concurrency can help minimize latency and save bandwidth and power.

In some embodiments, faster read-outs are possible by increasing the VBLANK (vertical blanking interval), and/or reducing the read-out time. In some embodiments, some sensors can be capable of being operated at different frames per second (FPS), and different configurations can be implemented using VBLANK (vertical blanking interval), for example. In some embodiments, in order to maintain the same FPS, one or more of the sensors can be operated at an FPS rate that is twice as fast, but only keeping every other frame (for example, a 50% duty cycle). Alternatively, the vertical blanking interval may be adjusted to obtain the same result. These and other techniques may be used to reduce the read-out time in accordance with some embodiments. Different techniques may be used based on how the sensor is designed, the type of sensor, etc.

In some embodiments, by obtaining faster read-outs (for example, by increasing the VBLANK and/or reducing the read-out time) and minimizing the concurrency (for example, using staggered triggering of one or more sensors relative to one or more other sensors) latency may be improved in a time-sharing environment. In some embodiments, concurrency is minimized as much as possible. Although minimizing the concurrency may be limited by various factors such as vertical blanking interval (VBLANK) limitations and minimal sensor times, for example, concurrency minimization can be implemented as much as possible in accordance with some embodiments while keeping such limiting factors in mind.

Flow diagram 600 includes frames (or a data stream) 632, including frames N, N+1, N+2, and N+3, which are similar to frames 622, but also show that the frames 632 may be in an on-the-fly (OTF) flow state during each of the frames, for example. Flow diagram 600 also includes frames (or a data stream) 634, including frames M, M+1, M+2, and M+3, which are similar to frames 624, but also show that the frames 632 may transition from a spilling (S) flow state to a chasing (C) flow state to an on-the-fly (OTF) flow state during each of the frames, for example. Although not illustrated in FIG. 6, it is noted that in some embodiments, a reconnect (R) flow state (for example, a fast reconnect flow state) may be included between the chasing (C) and the on-the-fly (OTF) illustrated in frames 634. During the spilling (S) state of frames 634, that part of the frames may be written to external (or remote) memory due to time sharing of the frame processing system causing it to be busy with frames 632 during that time. During the chasing (C) state of frames 634, that part of the frames may be processed by external (or remote) memory due to time sharing of the frame processing system causing it to be busy with completing the prior frame 632 but beginning to process the current frame 634 during that time. During the on-the-fly (OTF) state of frames 634, the rest of the frame data for the current frame 634 may be streamed via internal (or local) memory on the fly (OTF) in a manner that can save external (or remote) memory bandwidth as well as associated power.

In the example illustrated in FIG. 6, for example, with adjusted frames 632 and 634, both Sensor1 and Sensor2 data streams can benefit from reduced latency between the last pixel-in to last pixel-out. This can be accomplished due to staggering of the sensor triggers, for example, as the processing completes shortly after read-out. In some embodiments, Sensor1 data can be processed up to fully on-the-fly (OTF) via internal (local) memory, saving most or even all of its data bandwidth. Due to a minimal overlapping in time between sensor read-outs, a spilled portion of Sensor2 can become minimal, and can be quickly chased via the external (remote) memory. In this manner, a significant percentage of Sensor2 bandwidth can benefit from being reconnected and returned to on-the-fly (OTF). This can be accomplished even in time-shared image processing systems (for example, in system 300).

In some embodiments, minimization of input concurrency may be implemented using controlled sensor triggering in a staggered manner. Reducing or minimizing the concurrency can help minimize latency and save bandwidth and power, can allow maximization of internal memory usage, and can optimize the system memory bandwidth even in tight end-to-end latency conditions. System memory bandwidth savings can be very significant, depending, for example, on sensor read-out capabilities and frames per second (FPS) rate requirements. In some embodiments, concurrency is minimized as much as possible even if minimizing of the concurrency is limited by various factors such as vertical blanking interval (VBLANK) and sensor read-out time limitations, for example.

As illustrated in FIG. 6 by data streams 632 and 634, for example, input/output (I/O) control using spill/reconnect (and/or spill/chase/reconnect), a first sensor (for example, Sensor1) can be processed on-the-fly (OTF) using a time-shared processor without any intermediate buffering or storage of the data. That is, no storage is required between the input and the output other than a small on-chip memory (for example, a small cache memory such as local buffer 218). No write or read to an external memory is necessary during processing on-the-fly (OTF) in this manner, which results in a significant bandwidth savings for processing the Sensor1 frames in data stream 632.

Before the on-the-fly processing of the frames of data stream 632 are completed, the frames of the data stream 634 of Sensor2 have a slight overlap with the frames of the data stream 632 with some level of concurrency (although the concurrency may be limited as discussed above or may even be completely eliminated). During this time of resource contention while the time-shared processing resource is occupied and busy and is processing a frame of data stream 632 corresponding to Sensor1 on-the-fly (for example, triggering controller 314, computing device 100, and/or processor 316 is/are busy processing a frame of data stream 632 on-the-fly), intermediate storage for the incoming data of the frame of data stream 634 corresponding to Sensor2 is necessary. Therefore, spilling (S) for this portion of the frame of data stream 634 can be implemented (for example, while the remainder of the frame of data stream 632 is being processed on-the-fly) and the data can be sent to a far memory (for example, to external or remote memory). In some embodiments, additional techniques may be employed to further optimize the spilled (S) portion of the total data bandwidth and associated power, such as compression, packing, etc. When the on-the-fly (OTF) processing of the frame of stream 632 is completed, time-share processing becomes free, and chasing (C) of the spilled data for this portion of the frame of data stream 634 can be implemented by the time-share processing system (for example, using one or more of triggering controller 314, computing device 100, and/or processor 316). Since the processing can be faster than the input rate, chasing (C) occurs for a limited amount of time until processing catches up to the incoming data stream. Although processing during chasing (C) needs to go back to the beginning of the frame of stream 634, it is noted that in some embodiments, the time required for chasing (C) is much shorter than the time required for spilling (S) since processing time can be much faster than the receipt of the data stream. That is, in some embodiments, chasing (C) can happen much more quickly than illustrated in the frames of stream 634, and can be almost immediate, particularly when the spill (S) time is small (for example, due to the minimized concurrency of the frames of stream 632 with the frames of stream 634). In some embodiments, for example, the time during chase (C) is much faster than the time during spill (S). Once processing catches up to the incoming data stream, a reconnect (R) can occur (not illustrated in FIG. 6) and the system can quickly move to an on-the-fly (OTF) state in which both the read and write pointers are indexing the local memory and the frame of stream 634 can be processed on-the-fly (OTF). In this manner, in some embodiments, data stream processing (of frames of stream 632 and of stream 634) can be implemented on-the-fly (OTF) for a vast majority of the time. It is noted that although bandwidth and power savings can be provided due to staggered sensor exposure and/or minimized concurrency, for example, additional processing capacity can be taken advantage of to further increase bandwidth and power savings by implementing, for example, spill, chase, reconnect, and/or on-the-fly processing as described herein. Even in an implementation where sensor exposure is not staggered and/or concurrency is not minimized, significant bandwidth and power savings can still be provided using the spill, chase, and on-the-fly processing techniques as described herein.

Figure 7:
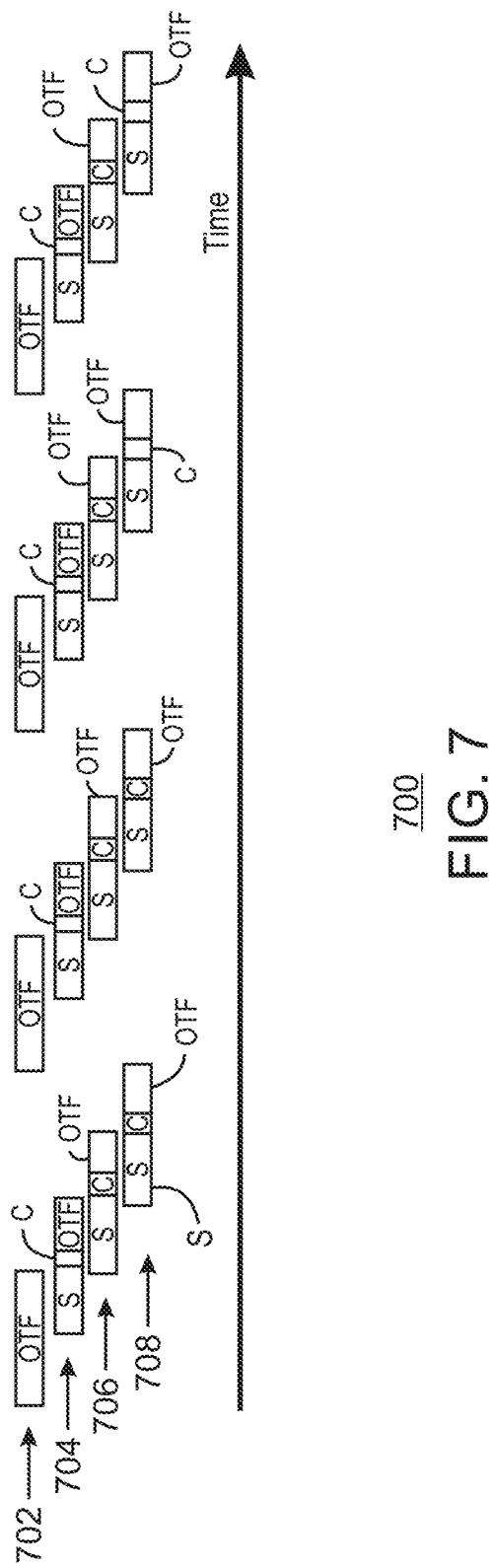
FIG. 7 illustrates flow state transition during frame transfer in accordance with some embodiments.

FIG. 7 illustrates flow state transition 700 during data transfer (for example, during data frame transfer and/or image frame transfer) in accordance with some embodiments. In some embodiments, flow 700 implements a same or similar flow state transition as flow 400, flow 500, and/or flow 600. Flow 700 can be implemented, for example, using system 300, computing device 100, sensors 312, triggering controller 314, and/or processor 316. It is noted that FIG. 7 illustrates an example with four sensors, but in some embodiments, any number of sensors may be providing data streams.

Flow diagram 700 includes frames (or a data stream) 702, including frames of a first sensor, which can be a first sensor included in sensors 312, for example. Flow diagram 700 also includes frames (or a data stream) 704, including frames of a second sensor, which can be a second sensor included in sensors 312, for example. Flow diagram 700 also includes frames (or a data stream) 706, including frames of a third sensor, which can be a third sensor included in sensors 312, for example. Flow diagram 700 also includes frames (or a data stream) 708, including frames of a fourth sensor, which can be a fourth sensor included in sensors 312, for example. In some embodiments, each of the frames (or data streams) 702, 704, 706, and/or 708 may be adjusted by staggered triggering of sensor exposure, and read-out time may be reduced. Additionally, state transitions may be dynamically adjusted during frame transfer time in accordance with some embodiments.

The frames (or data stream) 702 may be in an on-the-fly (OTF) flow state during each of the frames, for example. The frames (or data stream) 704 may transition from a spilling (S) flow state to a chasing (C) flow state to an on-the-fly (OTF) flow state during each of the frames, for example. The frames (or data stream) 706 may also transition from a spilling (S) flow state to a chasing (C) flow state to an on-the-fly (OTF) flow state during each of the frames, for example. The frames (or data stream) 708 may also transition from a spilling (S) flow state to a chasing (C) flow state to an on-the-fly (OTF) flow state during each of the frames, for example. Although not illustrated in FIG. 7, it is noted that in some embodiments, a reconnect (R) flow state (for example, a fast reconnect flow state) may be included between the chasing (C) and the on-the-fly (OTF) illustrated in frames 704, 706, and/or 708. In some embodiments, data streams (or frames) 702, 704, 706 and/or 708 may be time-shared, read-outs may be synchronized and adjusted, and triggers may be staggered.

Although the implementation illustrated in FIG. 7 is not the most advantageous. Although stream 702 is processed on-the-fly (OTF), other three streams 704, 706 and 708 are very concurrent. Although spilling (S) occurs for frames of streams 704, 706 and 708, once spilling (S) is finished for each frame, chasing (C) can be implemented for those frames and can happen very quickly. After chasing (C), some of each of the frames 704, 706 and 708 can then be processed on-the-fly (OTF). In this manner, residual processing capacity can be converted into bandwidth and power savings in accordance with some embodiments.

Figure 8:
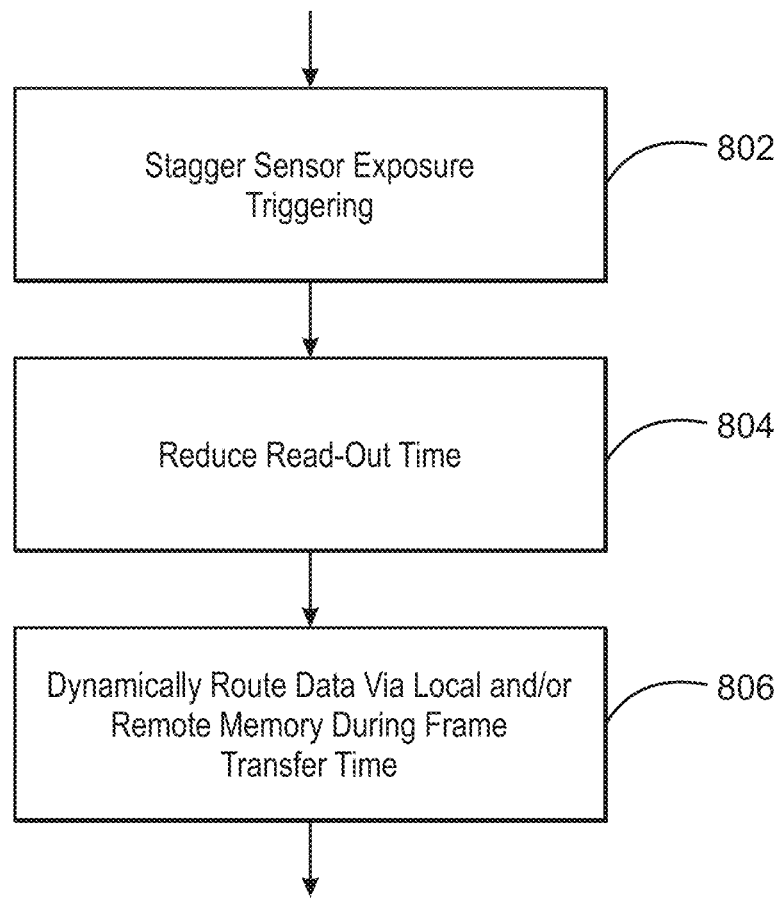
FIG. 8 illustrates flow during frame transfer in accordance with some embodiments.

FIG. 8 illustrates a flow 800 in accordance with some embodiments. In some embodiments, FIG. 8 illustrates flow 800 during data transfer (for example, during data frame transfer and/or image frame transfer) in accordance with some embodiments. In some embodiments, flow 800 implements a same or similar flow state transition as flow 400, flow 500, flow 600 and/or flow 700. Flow 800 can be implemented, for example, using system 300, computing device 100, sensors 312, triggering controller 314, and/or processor 316.

Flow 800 includes staggering of sensor exposure triggering at 802. Then the read-out time is reduced at 804. Data is dynamically routed via local and/or remote memory (for example, during frame transfer time) at 806. This dynamic routing via local and/or remote memory can be implemented using spill (S), chase (C), reconnect (R), and/or on-the-fly (OTF) techniques as described herein.

Figure 9:
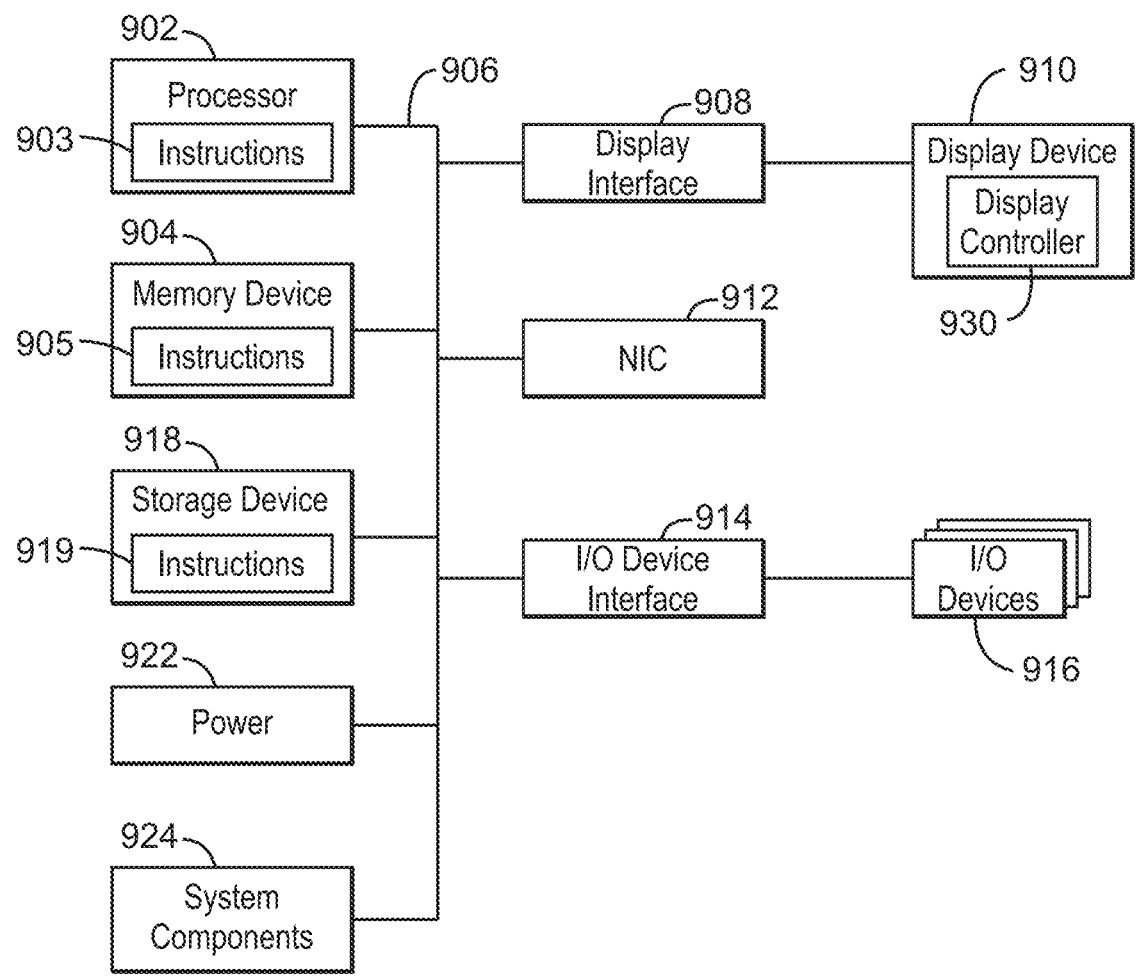
FIG. 9 illustrates a system in accordance with some embodiments.

FIG. 9 is a block diagram of an example of a computing device 900 in accordance with some embodiments. In some embodiments, computing device 900 may be the same as or similar to other computing devices illustrated and/or described herein. For example, computing device 900 may be the same as or similar to computing device 100 illustrated in any one or more of FIGS. 1-3. In some embodiments, computing device 900 may be included in any of the sensors 302, triggering controller 314, or processing 316, for example. In some embodiments, computing device 900 may be a computing device that implements any of the techniques described herein. In some embodiments, computing device 900 may implement functionality of more than one or all of the sensors 312, triggering controller 314, and/or processor 316. For example, in some embodiments, computing device 900 can implement triggering of sensor exposure, reducing read-out time, and/or dynamically routing data via local and/or remote memory during frame transfer time, etc. In some embodiments, any portion of the flow, circuits or systems illustrated in any one or more of the figures, and any of the embodiments described herein can be included in or be implemented by computing device 900. The computing device 900 may be, for example, a computing device, a server, a controller, and/or an application specific controller, among others.

The computing device 900 may include a processor 902 that is adapted to execute stored instructions (for example, instructions 903), as well as a memory device 904 (or storage 904) that stores instructions 905 that are executable by the processor 902. The processor 902 can be a single core processor, a multi-core processor, a computing cluster, or any number of other configurations. For example, processor 902 can be an Intel® processor such as an Intel® Celeron, Pentium, Core, Core i3, Core i5, or Core i7 processor. In some embodiments, processor 902 can be an Intel® x86 based processor. In some embodiments, processor 902 can be an ARM based processor. The memory device 904 can be a memory device or a storage device, and can include volatile storage, non-volatile storage, random access memory, read only memory, flash memory, or any other suitable memory or storage systems. The instructions that are executed by the processor 902 may also be used to implement any of the techniques as described in this specification. In some embodiments, processor 902 may include the same or similar features or functionality as, for example, various controllers or agents in this disclosure.

The processor 902 may also be linked through the system interconnect 906 (e.g., PCI®, PCI-Express®, NuBus, etc.) to a display interface 908 adapted to connect the computing device 900 to a display device 910. The display device 910 may include a display controller 930. Display device 910 may also include a display screen that is a built-in component of the computing device 900. The display device may also include a computer monitor, television, or projector, among others, that is externally connected to the computing device 900. In some embodiments, computing device 900 does not include a display interface or a display device. In some embodiments, computing device 900 can send data or image streams to multiple display devices.

In some embodiments, the display interface 908 can include any suitable graphics processing unit, transmitter, port, physical interconnect, and the like. In some examples, the display interface 908 can implement any suitable protocol for transmitting data to the display device 910. For example, the display interface 908 can transmit data using a high-definition multimedia interface (HDMI) protocol, a DisplayPort protocol, or some other protocol or communication link, and the like In addition, a network interface controller (also referred to herein as a NIC) 912 may be adapted to connect the computing device 900 through the system interconnect 906 to a network (not depicted). The network (not depicted) may be a cellular network, a radio network, a wide area network (WAN), a local area network (LAN), or the Internet, among others.

The processor 902 may be connected through system interconnect 906 to an input/output (I/O) device interface 914 adapted to connect the computing host device 900 to one or more I/O devices 916. The I/O devices 916 may include, for example, a keyboard or a pointing device, where the pointing device may include a touchpad or a touchscreen, among others. The I/O devices 916 may be built-in components of the computing device 900, or may be devices that are externally connected to the computing device 900.

In some embodiments, the processor 902 may also be linked through the system interconnect 906 to a storage device 918 that can include a hard drive, a solid-state drive (SSD), a magnetic drive, an optical drive, a USB flash drive, an array of drives, or any other type of storage, including combinations thereof. In some embodiments, the storage device 918 can include any suitable applications that can be used by processor 902 to implement any of the techniques described herein. In some embodiments, storage 918 stores instructions 919 that are executable by the processor 902. In some embodiments, the storage device 918 can include a basic input/output system (BIOS).

In some embodiments, a power device 922 is provided. For example, in some embodiments, power device 922 can provide charging, power, power supply, power delivery, power management, etc. In some embodiments, power 922 can include one or more power supply units (PSUs). In some embodiments, power 922 can be a part of system 900, and in some embodiments, power 922 can be external to the rest of system 900.

FIG. 9 also illustrates system components 924. In some embodiments, system components 924 can include any of display, camera, audio, storage, modem, or memory components, or any additional system components.

It is to be understood that the block diagram of FIG. 9 is not intended to indicate that the computing device 900 is to include all of the components shown in FIG. 9 in all embodiments. Rather, the computing device 900 can include fewer or additional components not illustrated in FIG. 9 (e.g., additional memory components, embedded controllers, additional modules, additional network interfaces, etc.).

Figure 10:
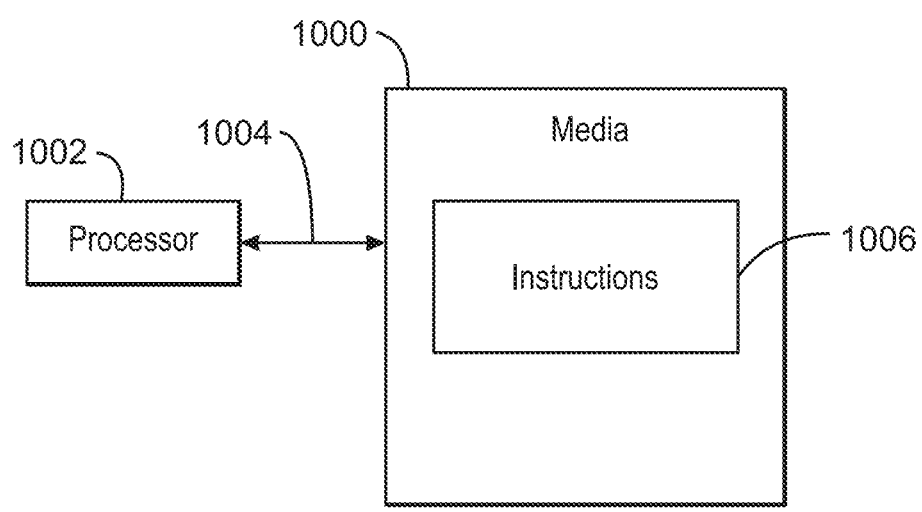
FIG. 10 illustrates a system in accordance with some embodiments.

FIG. 10 is a block diagram of an example of one or more processors 1002 and one or more tangible, non-transitory computer readable media 1000 for implementing any of the techniques illustrated and/or described herein, including image synchronization and/or processing. The one or more tangible, non-transitory, computer-readable media 1000 may be accessed by the processor(s) 1002 over a computer interconnect 1004. Furthermore, the one or more tangible, non-transitory, computer-readable media 1000 may include instructions (or code) 1006 to direct the processor(s) 1002 to perform operations as described herein. In some embodiments, processor 1002 is one or more processors. In some embodiments, processor(s) 1002 can perform some or all of the same or similar functions that can be performed by other elements described herein using instructions (code) 1006 included on media 1000. In some embodiments, one or more of processor(s) 1002 may include the same or similar features or functionality as, for example, various controllers, units, or agents, etc. described in this disclosure. In some embodiments, one or more processor(s) 1002, interconnect 1004, and/or media 1000 may be included in computing device 900.

Various components discussed in this specification may be implemented using software components. These software components may be stored on the one or more tangible, non-transitory, computer-readable media 1000, as indicated in FIG. 10. It is to be understood that any suitable number of software components may be included within the one or more tangible, non-transitory computer-readable media 1000. Furthermore, any number of additional software components shown or not shown in FIG. 10 may be included within the one or more tangible, non-transitory, computer-readable media 1000, depending on the specific application.

Figure 11:
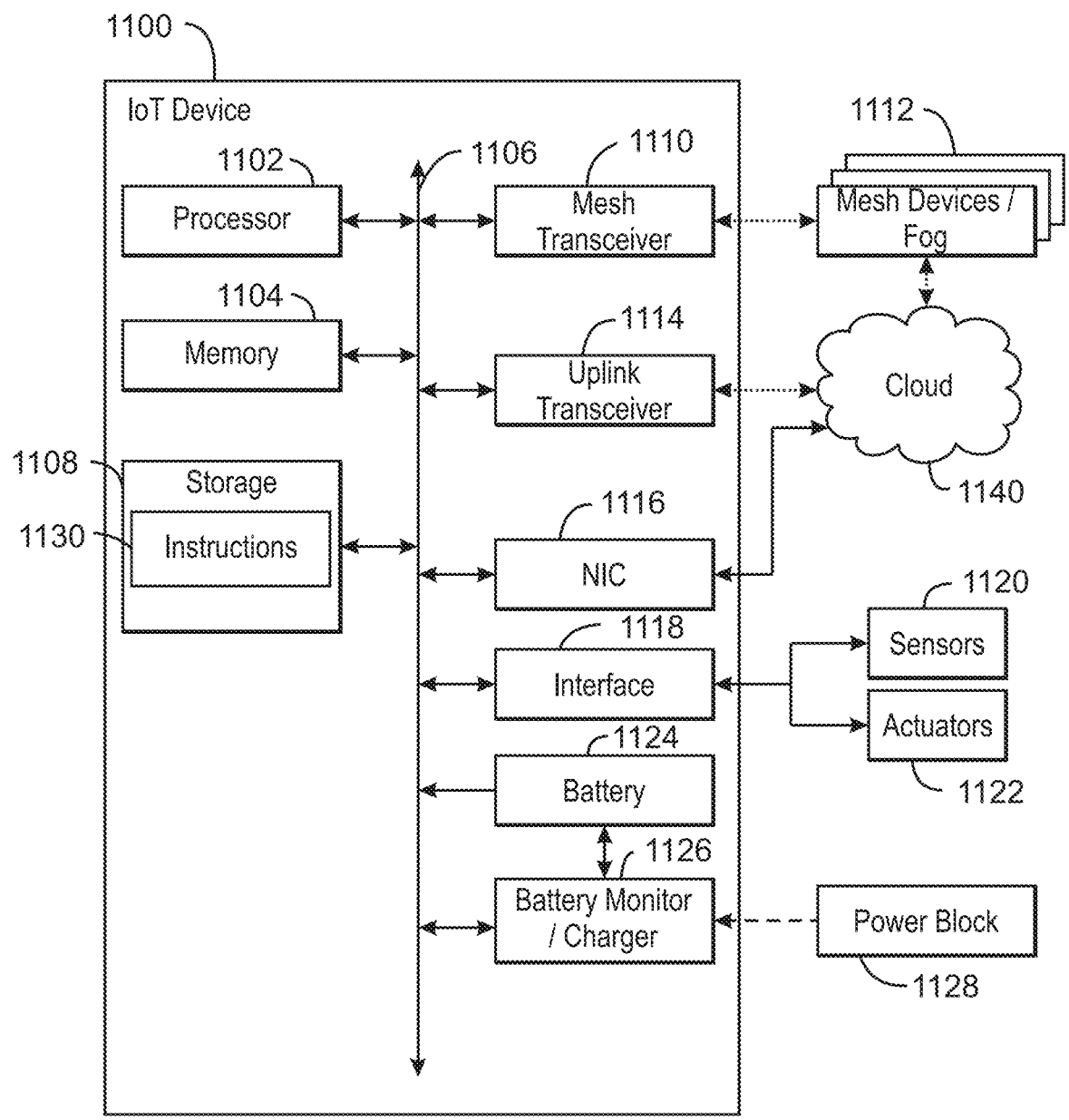
FIG. 11 illustrates a system in accordance with some embodiments.

FIG. 11 is a block diagram of an example of components that may be present in an IoT device 1100 for implementing any of the techniques illustrated or described herein. In some embodiments, IoT device 1100 may be a computing device that may be the same as or similar to other computing devices illustrated and/or described herein. For example, computing device 1100 may be the same as or similar to computing device 100 illustrated in any one or more of FIGS. 1-3. In some embodiments, computing device 1100 may be included in any of the sensors 302, triggering controller 314, or processing 316, for example. In some embodiments, computing device 1100 may implement functionality of more than one or all of the sensors 312, triggering controller 314, and/or processor 316. In some embodiments, computing device 1100 may be the same as or similar to computing device 900. In some embodiments, computing device 1100 may be a computing device that implements any of the techniques described herein. For example, in some embodiments, computing device 1100 can implement triggering of sensor exposure, reducing read-out time, and/or dynamically routing data via local and/or remote memory during frame transfer time, etc. In some embodiments, any portion of the flow, circuits or systems illustrated in any one or more of the figures, and any of the embodiments described herein can be included in or be implemented by computing device 1100.

The IoT device 1100 may include any combinations of the components shown in the example. The components may be implemented as ICs, portions thereof, discrete electronic devices, or other modules, logic, hardware, software, firmware, or a combination thereof adapted in the IoT device 1100, or as components otherwise incorporated within a chassis of a larger system. The block diagram of FIG. 11 is intended to show a high level view of components of the IoT device 1100. However, some of the components shown may be omitted, additional components may be present, and different arrangement of the components shown may occur in other implementations.

The IoT device 1100 may include a processor 1102, which may be a microprocessor, a multi-core processor, a multi-threaded processor, an ultra-low voltage processor, an embedded processor, or other known processing element. The processor 1102 may be a part of a system on a chip (SoC) in which the processor 1102 and other components are formed into a single integrated circuit, or a single package, such as the Edison™ or Galileo™ SoC boards from Intel. As an example, the processor 1102 may include an Intel® Architecture Core™ based processor, such as a Quark™, an Atom™, an i3, an i5, an i7, a Xeon®, a Xeon Phi™ co-processor, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as a processor from Apple® Inc. (for example, an A5-A10 processor from Apple® Inc.), a Snapdragon™ processor from Qualcomm® Technologies, Inc., or an OMAP™ processor from Texas Instruments, Inc.

The processor 1102 may communicate with a system memory 1104 over a bus 1106. Any number of memory devices may be used to provide for a given amount of system memory. As examples, the memory can be random access memory (RAM) in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard, such as LPDDR3 or LPDDR4 that will offer extensions to LPDDR2 to increase bandwidth. In various implementations the individual memory devices may be of any number of different package types such as single die package (SDP), dual die package (DDP) or quad die package (Q17P). These devices, in some embodiments, may be directly soldered onto a motherboard to provide a lower profile solution, while in other embodiments the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. For example, a memory may be sized between 2 GB and 16 GB, and may be configured as a DDR3LM package or an LPDDR2 or LPDDR3 memory, which is soldered onto a motherboard via a ball grid array (BGA).

To provide for persistent storage of information such as data, applications, operating systems and so forth, a mass storage 1108 may also be coupled to the processor 1102 via the bus 1106. To enable a thinner and lighter system design, the mass storage 1108 may be implemented via a solid state drive (SSD). Other devices that may be used for the mass storage 1108 include flash memory cards, such as SD cards, microSD cards, xD picture cards, and the like, and USB flash drives.

In low power implementations, the mass storage 1108 may be on-die memory or registers associated with the processor 1102. However, in some examples, the mass storage 1108 may be implemented using a micro hard disk drive (HDD). Further, any number of new technologies may be used for the mass storage 1108 in addition to, or instead of, the technologies described, such resistance change memories, phase change memories, holographic memories, or chemical memories, among others. For example, the IoT device 1100 may incorporate the 3D XPOINT memories from Intel® and Micron®.

The components may communicate over the bus 1106. The bus 1106 may include any number of technologies, including industry standard architecture (ISA), extended ISA (EISA), peripheral component interconnect (PCI), peripheral component interconnect extended (PCIx), PCI express (PCIe), or any number of other technologies. The bus 1106 may be a proprietary bus, for example, used in a SoC based system. Other bus systems may be included, such as an I²C interface, I³C interface, an SPI interface, point to point interfaces, and a power bus, among others.

The bus 1106 may couple the processor 1102 to a mesh transceiver 1110, for communications with other mesh devices 1112. The mesh transceiver 1110 may use any number of frequencies and protocols, such as 2.4 gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1112. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, can occur via a WWAN unit.

The mesh transceiver 1110 may communicate using multiple standards or radios for communications at different range. For example, the IoT device 1100 may communicate with geographically proximate devices, e.g., within about 10 meters, using a local transceiver based on BLE, or another low power radio, to save power. More distant mesh devices 1112, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee. The mesh transceiver 1110 may be incorporated into an MCU as an address directly accessible by the chip, such as in the Curie® units available from Intel.

An uplink transceiver 1114 may be included to communicate with devices in the cloud 1140. The uplink transceiver 1114 may be LPWA transceiver that follows the IEEE 802.15.4, IEEE 802.15.4g, IEEE 802.15.4e, IEEE 802.15.4k, or NB-IoT standards, among others. The IoT device 1100 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, Weightless-P from the Weightless Special Interest Group, Random Phase Multiple Access (RPMA®) from Ingenu, and other technologies. Further, other communications techniques, such as time-slotted channel hopping, described in the IEEE 802.15.4e specification may be used.

Any number of other radio communications and protocols may be used in addition to the systems mentioned for the mesh transceiver 1110 and uplink transceiver 1114, as described herein. For example, the radio transceivers 1110 and 1112 may include an LTE or other cellular transceiver that uses spread spectrum (SPA/SAS) communications for implementing high-speed communications, such as for video transfers. Further, any number of other protocols may be used, such as Wi-Fi® networks for medium speed communications, such as still pictures, sensor readings, and provision of network communications.

The radio transceivers 1110 and 1112 may include radios that are compatible with any number of 3GPP (Third Generation Partnership Project) specifications, notably Long Term Evolution (LTE), Long Term Evolution-Advanced (LTE-A), Long Term Evolution-Advanced Pro (LTE-A Pro), or Narrow Band IoT (NB-IoT), among others. It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology. Other Third Generation Partnership Project (3GPP) radio communication technology that may be used includes UMTS (Universal Mobile Telecommunications System), FOMA (Freedom of Multimedia Access), 3GPP LTE (Long Term Evolution), 3GPP LTE Advanced (Long Term Evolution Advanced), 3GPP LTE Advanced Pro (Long Term Evolution Advanced Pro)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High-speed Packet Access), HSDPA (High-Speed Downlink Packet Access), HSUPA (High-Speed Uplink Packet Access), HSPA+ (High-speed Packet Access Plus), UMTS-TDD (Universal Mobile Telecommunications System-Time-Division Duplex), TD-CDMA (Time Division-Code Division Multiple Access), TD-SCDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handyphone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11ay, and the like. In addition to the standards listed above, any number of satellite uplink technologies may be used for the uplink transceiver 1114, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1116 may be included to provide a wired communication to the cloud 1140 or to other devices, such as the mesh devices 1112. The wired communication may provide an Ethernet connection, or may be based on other types of networks, such as Controller Area Network (CAN), Local Interconnect Network (LIN), DeviceNet, ControlNet, Data Highway+, EtherCAT, SERCOS, PROFIBUS, PROFINET RT, or PROFINET IRT, among many others. An additional NIC 1116 may be included to allow connection to a second network, for example, a NIC 1116 providing communications to the cloud over Ethernet, and a second NIC 1116 providing communications to other devices over another type of network.

The bus 1106 may couple the processor 1102 to an interface 1118 that is used to connect external devices. The external devices may include sensors 1120, such as accelerometers, level sensors, flow sensors, temperature sensors, pressure sensors, barometric pressure sensors, camera sensors, and the like. The interface 1118 may be used to connect the IoT device 1100 to actuators 1122, such as power switches, valve actuators, an audible sound generator, a visual warning device, and the like.

While not shown, various input/output (I/O) devices may be present within, or connected to, the IoT device 1100. For example, a display may be included to show information, such as sensor readings or actuator position. An input device, such as a touch screen or keypad may be included to accept input.

A battery 1124 may power the IoT device 1100, although in examples in which the IoT device 1100 is mounted in a fixed location, it may have a power supply coupled to an electrical grid. The battery 1124 may be a lithium ion battery, a metal-air battery, such as a zinc-air battery, an aluminum-air battery, a lithium-air battery, a hybrid supercapacitor, and the like.

A battery monitor/charger 1126 may be included in the IoT device 1100 to track the state of charge (SoCh) of the battery 1120. The battery monitor/charger 1126 may be used to monitor other parameters of the battery 1124 to provide failure predictions, such as the state of health (SoH) and the state of function (SoF) of the battery 1124. The battery monitor/charger 1126 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1126 may communicate the information on the battery 1124 to the processor 1102 over the bus 1106. The battery monitor/charger 1126 may also include an analog-to-digital (ADC) convertor that allows the processor 1102 to directly monitor the voltage of the battery 1124 or the current flow from the battery 1124. The battery parameters may be used to determine actions that the IoT device 1100 may perform, such as transmission frequency, mesh network operation, sensing frequency, and the like.

A power block 1128, or other power supply coupled to a grid, may be coupled with the battery monitor/charger 1126 to charge the battery 1124. In some examples, the power block 1128 may be replaced with a wireless power receiver to obtain the power wirelessly, for example, through a loop antenna in the IoT device 1100. A wireless battery charging circuit, such as an LTC4020 chip from Linear Technologies of Milpitas, Calif., among others, may be included in the battery monitor/charger 1126. The specific charging circuits chosen depend on the size of the battery 1124, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others. In some examples, the power block 1128 may be augmented or replaced with solar panels, a wind generator, a water generator, or other natural power systems.

The mass storage 1108 may include a number of modules to implement any of the techniques described herein. Although shown as code blocks in the mass storage 1108, it may be understood that any of the modules may be fully or partially replaced with hardwired circuits, for example, built into an application specific integrated circuit (ASIC). The mass storage 1108 may include instructions (or code) 1130 according to some embodiments. Instructions 1130 can include code to implement any of the techniques described herein. In some embodiments, IoT device 1100 can include a system or a subsystem to implement any of the techniques described herein. For example, in some embodiments, IoT device 1100 can be or can include a system or subsystem such as, for example, an edge device, a fog device, a gateway, or any other IoT device implementing any of the techniques illustrated and described herein.

Examples and embodiments of various techniques have been illustrated and described herein as being implemented, for example, using a processor executing stored instructions. However, it is noted that other examples and embodiments of any of these techniques can includes other implementations. For example, any of the techniques illustrated or described herein can be implemented in any of hardware, software, firmware, or in any combination thereof. Some embodiments can be implemented, for example, using an Application Specific Integrated Circuit (ASIC) or a Field Programmable Gate Array (FPGA), among others.

Figure 12:
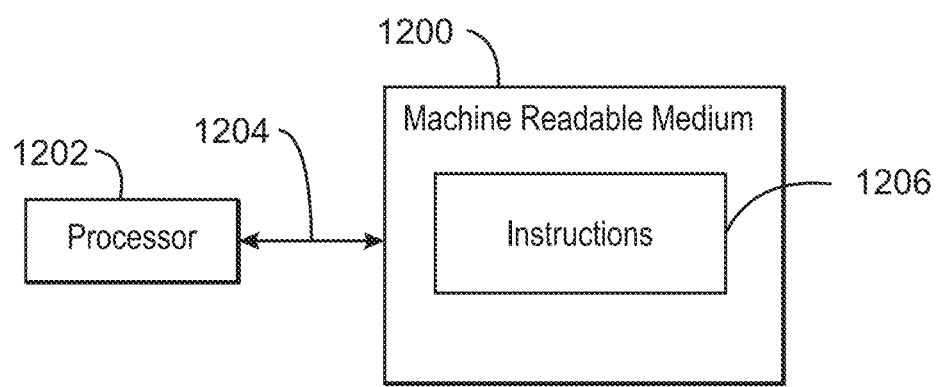
FIG. 12 illustrates a system in accordance with some embodiments.

FIG. 12 is a block diagram of an exemplary non-transitory, machine readable medium 1200 including code to direct a processor 1202 to implement any of the techniques described herein in accordance with some embodiments. The processor 1202 may access the non-transitory, machine readable medium 1200 over a bus 1204. The processor 1202 and bus 1204 may be selected as described with respect to the processor 1102 and bus 1106 of FIG. 11. The non-transitory, machine readable medium 1200 may include devices described for the mass storage 1108 of FIG. 11 or may include optical disks, thumb drives, or any number of other hardware devices.

The non-transitory, machine readable medium 1200 may include instructions (or code) 1206 to direct the processor 1202 to implement any of the techniques described herein.

In some embodiments, the techniques described herein can be implemented by a processor such as processor 1102 or processor 1202 running software or firmware, or some combination thereof. However, in some embodiments, the techniques described herein may be implemented using other types of processors or controllers. For example, in some embodiments, the techniques described herein may be implemented by a controller such as an ASIC (application specific integrated circuit) or an FPGA (field programmable gate array), for example.

The techniques described herein may be used to implement any number of networks (for example, IoT networks) for various purposes. Additional applications may be implemented.

Reference in the specification to "one embodiment" or "an embodiment" or "some embodiments" of the disclosed subject matter means that a particular feature, structure, or characteristic described in connection with the embodiment is included in at least one embodiment of the disclosed subject matter. Thus, the phrase "in one embodiment" or "in some embodiments" may appear in various places throughout the specification, but the phrase may not necessarily refer to the same embodiment or embodiments.

Example 1 In some examples, a computing device for processing data streams includes storage to store instructions and a processor to execute the instructions. The processor is to execute the instructions to receive respective data streams provided from a plurality of data producer sensors, to stagger a time of triggering of a first of the plurality of data producer sensors relative to a time of triggering of a second of the plurality of data producer sensors to minimize a concurrency of data frames of the data stream received from the first data producer sensor and data frames of the data stream received from the second of the plurality of data producer sensors, to process the data streams from the plurality of data producer sensors in a time-shared manner, and to provide the processed data streams to one or more consumer of the processed data streams.

Example 2 includes the subject matter of example 1. In example 2, the processor is to execute the instructions to reduce read out times of data frames of the data stream received from the first data producer sensor and data frames of the data stream received from the second of the plurality of data producer sensors.

Example 3 includes the subject matter of any of examples 1-2. In example 3, the processor is to execute the instructions to dynamically transition between processing states during a time of transfer of the data frames of the data stream received from the first data producer sensor and during a time of transfer of the data frames of the data stream received from the second of the plurality of data producer sensors.

Example 4 includes the subject matter of any of examples 1-3. In example 4, the processor is to execute the instructions to transition between processing states during a time of transfer of the data frames of the data stream received from the first data producer sensor and during a time of transfer of the data frames of the data stream received from the second of the plurality of data producer sensors, wherein the processing states include read and write access to a local memory and read and write access to a remote memory.

Example 5 includes the subject matter of any of examples 1-4. In example 5, the processing states include an on-the-fly state in which a read pointer is indexed to the local memory and a write pointer is indexed to the local memory.

Example 6 includes the subject matter of any of examples 1-5. In example 6, the processing states include a spilling state in which the read pointer is indexed to the local memory and the write pointer is indexed to the remote memory.

Example 7 includes the subject matter of any of examples 1-6. In example 7, the processing states include a chasing state in which the read pointer is indexed to the remote memory and the write pointer is indexed to the remote memory.

Example 8 includes the subject matter of any of examples 1-7. In example 8, the processing states include a reconnect state in which the read pointer is indexed to the remote memory and the write pointer is indexed to the local memory.

Example 9 includes the subject matter of any of examples 1-8. In example 9, a read pointer and a write pointer, where the read pointer never underruns the write pointer.

Example 10 includes the subject matter of any of examples 1-9. In example 10, a read pointer and a write pointer, where the write pointer never overruns the read pointer.

Example 11 includes the subject matter of any of examples 1-10. In example 11, the plurality of data producer sensors include a plurality of camera sensors.

Example 12 includes the subject matter of any of examples 1-11. In example 12, the one or more consumer includes one or more displays.

Example 13 includes at least one computer readable storage medium having instructions stored thereon. The instructions when executed on a processor cause the processor to receive respective data streams provided from a plurality of data producer sensors, to stagger a time of triggering of a first of the plurality of data producer sensors relative to a time of triggering of a second of the plurality of data producer sensors to minimize a concurrency of data frames of the data stream received from the first data producer sensor and data frames of the data stream received from the second of the plurality of data producer sensors, to process the data streams from the plurality of data producer sensors in a time-shared manner, and to provide the processed data streams to one or more consumer of the processed data streams.

Example 14 includes the subject matter of example 13. In example 14, the instructions when executed on a processor cause the processor to reduce read out times of data frames of the data stream received from the first data producer sensor and data frames of the data stream received from the second of the plurality of data producer sensors.

Example 15 includes the subject matter of any of examples 13-14. In example 15, the instructions when executed on a processor cause the processor to dynamically transition between processing states during a time of transfer of the data frames of the data stream received from the first data producer sensor and during a time of transfer of the data frames of the data stream received from the second of the plurality of data producer sensors.

Example 16 includes the subject matter of any of examples 13-15. In example 16, the instructions when executed on a processor cause the processor to transition between processing states during a time of transfer of the data frames of the data stream received from the first data producer sensor and during a time of transfer of the data frames of the data stream received from the second of the plurality of data producer sensors, wherein the processing states include read and write access to a local memory and read and write access to a remote memory.

Example 17 includes the subject matter of any of examples 13-16. In example 17, the processing states include an on-the-fly state in which a read pointer is indexed to the local memory and a write pointer is indexed to the local memory.

Example 18 includes the subject matter of any of examples 13-17. In example 18, the processing states include a spilling state in which the read pointer is indexed to the local memory and the write pointer is indexed to the remote memory.

Example 19 includes the subject matter of any of examples 13-18. In example 19, the processing states include a chasing state in which the read pointer is indexed to the remote memory and the write pointer is indexed to the remote memory.

Example 20 includes the subject matter of any of examples 13-19. In example 20, the processing states include a reconnect state in which the read pointer is indexed to the remote memory and the write pointer is indexed to the local memory.

Example 21 includes the subject matter of any of examples 13-20. In example 21, a read pointer and a write pointer, where the read pointer never underruns the write pointer.

Example 22 includes the subject matter of any of examples 13-21. In example 22, a read pointer and a write pointer, where the write pointer never overruns the read pointer.

Example 23 includes the subject matter of any of examples 13-22. In example 23, where the plurality of data producer sensors include a plurality of camera sensors.

Example 24 includes the subject matter of any of examples 13-23. In example 24, where the one or more consumer includes one or more displays.

Example 25 includes a method including receiving respective data streams provided from a plurality of data producer sensors, staggering a time of triggering of a first of the plurality of data producer sensors relative to a time of triggering of a second of the plurality of data producer sensors to minimize a concurrency of data frames of the data stream received from the first data producer sensor and data frames of the data stream received from the second of the plurality of data producer sensors, processing the data streams from the plurality of data producer sensors in a time-shared manner, and providing the processed data streams to one or more consumer of the processed data streams.

Example 26 includes the subject matter of example 25. In example 26, the method includes reducing read out times of data frames of the data stream received from the first data producer sensor and data frames of the data stream received from the second of the plurality of data producer sensors.

Example 27 includes the subject matter of any of examples 25-26. In example 27, the method includes dynamically transitioning between processing states during a time of transfer of the data frames of the data stream received from the first data producer sensor and during a time of transfer of the data frames of the data stream received from the second of the plurality of data producer sensors.

Example 28 includes the subject matter of any of examples 25-27. In example 28, the method includes transitioning between processing states during a time of transfer of the data frames of the data stream received from the first data producer sensor and during a time of transfer of the data frames of the data stream received from the second of the plurality of data producer sensors, where the processing states include read and write access to a local memory and read and write access to a remote memory.

Example 29 includes the subject matter of any of examples 25-28. In example 29, the processing states include an on-the-fly state in which a read pointer is indexed to the local memory and a write pointer is indexed to the local memory.

Example 30 includes the subject matter of any of examples 25-29. In example 30, the processing states include a spilling state in which the read pointer is indexed to the local memory and the write pointer is indexed to the remote memory.

Example 31 includes the subject matter of any of examples 25-30. In example 31, the processing states include a chasing state in which the read pointer is indexed to the remote memory and the write pointer is indexed to the remote memory.

Example 32 includes the subject matter of any of examples 25-31. In example 32, the processing states include a reconnect state in which the read pointer is indexed to the remote memory and the write pointer is indexed to the local memory.

Example 33 includes the subject matter of any of examples 25-32. In example 33, including a read pointer and a write pointer, where the read pointer never underruns the write pointer.

Example 34 includes the subject matter of any of examples 25-33. In example 34, including a read pointer and a write pointer, where the write pointer never overruns the read pointer.

Example 35 includes the subject matter of any of examples 25-34. In example 35, where the plurality of data producer sensors include a plurality of camera sensors.

Example 36 includes the subject matter of any of examples 25-35. In example 36, where the one or more consumer includes one or more displays.

Example 37 includes an apparatus for processing data streams, including means for receiving respective data streams provided from a plurality of data producer sensors, means for staggering a time of triggering of a first of the plurality of data producer sensors relative to a time of triggering of a second of the plurality of data producer sensors to minimize a concurrency of data frames of the data stream received from the first data producer sensor and data frames of the data stream received from the second of the plurality of data producer sensors, means for processing the data streams from the plurality of data producer sensors in a time-shared manner, and means for providing the processed data streams to one or more consumer of the processed data streams.

Example 38 includes the subject matter of example 37. In example 38, the method includes reducing read out times of data frames of the data stream received from the first data producer sensor and data frames of the data stream received from the second of the plurality of data producer sensors.

Example 39 includes the subject matter of any of examples 37-38. In example 39, the method includes dynamically transitioning between processing states during a time of transfer of the data frames of the data stream received from the first data producer sensor and during a time of transfer of the data frames of the data stream received from the second of the plurality of data producer sensors.

Example 40 includes the subject matter of any of examples 37-39. In example 40, the method includes transitioning between processing states during a time of transfer of the data frames of the data stream received from the first data producer sensor and during a time of transfer of the data frames of the data stream received from the second of the plurality of data producer sensors, where the processing states include read and write access to a local memory and read and write access to a remote memory.

Example 41 includes the subject matter of any of examples 37-40. In example 41, the processing states include an on-the-fly state in which a read pointer is indexed to the local memory and a write pointer is indexed to the local memory.

Example 42 includes the subject matter of any of examples 37-41. In example 42, the processing states include a spilling state in which the read pointer is indexed to the local memory and the write pointer is indexed to the remote memory.

Example 43 includes the subject matter of any of examples 37-42. In example 43, the processing states include a chasing state in which the read pointer is indexed to the remote memory and the write pointer is indexed to the remote memory.

Example 44 includes the subject matter of any of examples 37-43. In example 44, the processing states include a reconnect state in which the read pointer is indexed to the remote memory and the write pointer is indexed to the local memory.

Example 45 includes the subject matter of any of examples 37-44. In example 45, including a read pointer and a write pointer, where the read pointer never underruns the write pointer.

Example 46 includes the subject matter of any of examples 37-45. In example 46, including a read pointer and a write pointer, where the write pointer never overruns the read pointer.

Example 47 includes the subject matter of any of examples 37-46. In example 47, where the plurality of data producer sensors include a plurality of camera sensors.

Example 48 includes the subject matter of any of examples 37-47. In example 48, where the one or more consumer includes one or more displays.

Example 49 In some examples, a data stream processing system, including a plurality of data producer sensors to produce respective data streams. The system includes a processor to execute instructions to stagger a time of triggering of a first of the plurality of data producer sensors relative to a time of triggering of a second of the plurality of data producer sensors to minimize a concurrency of data frames of the data stream received from the first data producer sensor and data frames of the data stream received from the second of the plurality of data producer sensors, to process the data streams from the plurality of data producer sensors in a time-shared manner, and to provide the processed data streams. The system also includes one or more consumer of the processed data streams.

Example 50 includes the subject matter of example 49. In example 50, the processor is to execute the instructions to reduce read out times of data frames of the data stream received from the first data producer sensor and data frames of the data stream received from the second of the plurality of data producer sensors.

Example 51 includes the subject matter of any of examples 49-50. In example 51, the processor is to execute the instructions to dynamically transition between processing states during a time of transfer of the data frames of the data stream received from the first data producer sensor and during a time of transfer of the data frames of the data stream received from the second of the plurality of data producer sensors.

Example 52 includes the subject matter of any of examples 49-51. In example 52, the processor is to execute the instructions to transition between processing states during a time of transfer of the data frames of the data stream received from the first data producer sensor and during a time of transfer of the data frames of the data stream received from the second of the plurality of data producer sensors, wherein the processing states include read and write access to a local memory and read and write access to a remote memory.

Example 53 includes the subject matter of any of examples 49-52. In example 53, the processing states include an on-the-fly state in which a read pointer is indexed to the local memory and a write pointer is indexed to the local memory.

Example 54 includes the subject matter of any of examples 49-53. In example 54, the processing states include a spilling state in which the read pointer is indexed to the local memory and the write pointer is indexed to the remote memory.

Example 55 includes the subject matter of any of examples 49-54. In example 55, the processing states include a chasing state in which the read pointer is indexed to the remote memory and the write pointer is indexed to the remote memory.

Example 56 includes the subject matter of any of examples 49-55. In example 56, the processing states include a reconnect state in which the read pointer is indexed to the remote memory and the write pointer is indexed to the local memory.

Example 57 includes the subject matter of any of examples 49-56. In example 57, a read pointer and a write pointer, where the read pointer never underruns the write pointer.

Example 58 includes the subject matter of any of examples 49-57. In example 58, a read pointer and a write pointer, where the write pointer never overruns the read pointer.

Example 59 includes the subject matter of any of examples 49-58. In example 59, the plurality of data producer sensors include a plurality of camera sensors.

Example 60 includes the subject matter of any of examples 49-59. In example 60, the one or more consumer includes one or more displays.

Example 61 In some examples, an apparatus for processing data streams includes a triggering controller to stagger a time of triggering of a first of a plurality of data producer sensors relative to a time of triggering of a second of the plurality of data producer sensors and a processor to process data streams from the plurality of data producer sensors in a time-shared manner, the processed data streams to be provided for consumption by one or more consumer.

Example 62 includes the subject matter of example 61. In example 62, the triggering controller is to minimize a concurrency of data frames of the data stream received from the first data producer sensor and data frames of the data stream received from the second of the plurality of data producer sensors.

Example 63 includes the subject matter of any of examples 61-62. In example 63, the triggering controller is to reduce read out times of data frames of the data stream received from the first data producer sensor and data frames of the data stream received from the second of the plurality of data producer sensors.

Example 64 includes the subject matter of any of examples 61-63. In example 64, the processor is to dynamically transition between processing states during a time of transfer of the data frames of the data stream received from the first data producer sensor and during a time of transfer of the data frames of the data stream received from the second of the plurality of data producer sensors.

Example 65 includes the subject matter of any of examples 61-64. In example 65, the processor is to transition between processing states during a time of transfer of the data frames of the data stream received from the first data producer sensor and during a time of transfer of the data frames of the data stream received from the second of the plurality of data producer sensors, wherein the processing states include read and write access to a local memory and read and write access to a remote memory.

Example 66 includes the subject matter of any of examples 61-65. In example 66, the processing states include an on-the-fly state in which a read pointer is indexed to the local memory and a write pointer is indexed to the local memory.

Example 67 includes the subject matter of any of examples 61-66. In example 67, the processing states include a spilling state in which the read pointer is indexed to the local memory and the write pointer is indexed to the remote memory.

Example 68 includes the subject matter of any of examples 61-67. In example 68, the processing states include a chasing state in which the read pointer is indexed to the remote memory and the write pointer is indexed to the remote memory.

Example 69 includes the subject matter of any of examples 61-68. In example 69, the processing states include a reconnect state in which the read pointer is indexed to the remote memory and the write pointer is indexed to the local memory.

Example 70 includes the subject matter of any of examples 61-69. In example 70, a read pointer and a write pointer are included. The read pointer never underruns the write pointer.

Example 71 includes the subject matter of any of examples 61-70. In example 71, a read pointer and a write pointer are included. The write pointer never overruns the read pointer.

Example 72 includes the subject matter of any of examples 61-71. In example 72, the plurality of data producer sensors include a plurality of camera sensors.

Example 73 includes the subject matter of any of examples 61-72. In example 73, the one or more consumer includes one or more displays and/or one or more media encoders.

Example 74 In some examples, an apparatus for processing data streams includes means for staggering a time of triggering of a first of a plurality of data producer sensors relative to a time of triggering of a second of the plurality of data producer sensors and means for processing data streams from the plurality of data producer sensors in a time-shared manner, the processed data streams to be provided for consumption by one or more consumer.

Example 75 includes the subject matter of example 74. In example 75, including means for minimizing a concurrency of data frames of the data stream received from the first data producer sensor and data frames of the data stream received from the second of the plurality of data producer sensors.

Example 76 includes the subject matter of any of examples 74-75. In example 76, including means for reducing read out times of data frames of the data stream received from the first data producer sensor and data frames of the data stream received from the second of the plurality of data producer sensors.

Example 77 includes the subject matter of any of examples 74-76. In example 77, including means for dynamically transitioning between processing states during a time of transfer of the data frames of the data stream received from the first data producer sensor and during a time of transfer of the data frames of the data stream received from the second of the plurality of data producer sensors.

Example 78 includes the subject matter of any of examples 74-77. In example 78, including means for dynamically transitioning between processing states during a time of transfer of the data frames of the data stream received from the first data producer sensor and during a time of transfer of the data frames of the data stream received from the second of the plurality of data producer sensors, wherein the processing states include read and write access to a local memory and read and write access to a remote memory.

Example 79 includes the subject matter of any of examples 74-78. In example 79, the processing states include an on-the-fly state in which a read pointer is indexed to the local memory and a write pointer is indexed to the local memory.

Example 80 includes the subject matter of any of examples 74-79. In example 80, the processing states include a spilling state in which the read pointer is indexed to the local memory and the write pointer is indexed to the remote memory.

Example 81 includes the subject matter of any of examples 74-80. In example 81, the processing states include a chasing state in which the read pointer is indexed to the remote memory and the write pointer is indexed to the remote memory.

Example 82 includes the subject matter of any of examples 74-81. In example 82, the processing states include a reconnect state in which the read pointer is indexed to the remote memory and the write pointer is indexed to the local memory.

Example 83 includes the subject matter of any of examples 74-82. In example 83, a read pointer and a write pointer are included. The read pointer never underruns the write pointer.

Example 84 includes the subject matter of any of examples 74-83. In example 84, a read pointer and a write pointer are included. The write pointer never overruns the read pointer.

Example 85 includes the subject matter of any of examples 74-84. In example 85, the plurality of data producer sensors include a plurality of camera sensors.

Example 86 includes the subject matter of any of examples 74-85. In example 86, the one or more consumer includes one or more displays and/or one or more media encoders.

Example 87 In some examples, an apparatus including means to perform a method as in any other example.

Example 88 In some examples, machine-readable storage including machine-readable instructions, when executed, to implement a method or realize an apparatus as in any other example.

Example 89 In some examples, one or more machine readable medium including code, when executed, to cause a machine to perform the method of any other example.

Although example embodiments and examples of the disclosed subject matter are described with reference to circuit diagrams, flow diagrams, block diagrams etc. in the drawings, persons of ordinary skill in the art will readily appreciate that many other ways of implementing the disclosed subject matter may alternatively be used. For example, the arrangements of the elements in the diagrams, or the order of execution of the blocks in the diagrams may be changed, or some of the circuit elements in circuit diagrams, and blocks in block/flow diagrams described may be changed, eliminated, or combined. Any elements as illustrated or described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, one or more volatile or non-volatile memory devices, such as storage devices or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile or non-volatile memory readable by the processor, at least one input device or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, or in a distributed environment, and with program code stored locally or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter. For example, in each illustrated embodiment and each described embodiment, it is to be understood that the diagrams of the figures and the description herein is not intended to indicate that the illustrated or described devices include all of the components shown in a particular figure or described in reference to a particular figure. In addition, each element may be implemented with logic, wherein the logic, as referred to herein, can include any suitable hardware (e.g., a processor, among others), software (e.g., an application, among others), firmware, or any suitable combination of hardware, software, and firmware, for example.

What is claimed is:

1. An apparatus for processing data streams, comprising:
    a hardware triggering controller to stagger a time of triggering of a first of a plurality of data producer sensors relative to a time of triggering of a second of the plurality of data producer sensors; and
    a hardware processor to process data streams from the plurality of data producer sensors in a time-shared manner, the processor to transition between processing states during a time of transfer of the data frames of the data stream received from the first of the plurality of data producer sensors and during a time of transfer of the data frames of the data stream received from the second of the plurality of data producer sensors, wherein the processing states include read and write access to a local memory and read and write access to a remote memory, the processed data streams to be provided for consumption by one or more consumer, the processor to transition between the processing states, wherein the processing states include an on-the-fly state in which a read pointer is indexed to the local memory and a write pointer is indexed to the local memory.

2. The apparatus of claim 1, the triggering controller to minimize a concurrency of data frames of the data stream received from the first of the plurality of data producer sensors, and data frames of the data stream received from the second of the plurality of data producer sensors.

3. The apparatus of claim 1, the triggering controller to reduce read out times of data frames of the data stream received from the first of the plurality of data producer sensors and data frames of the data stream received from the second of the plurality of data producer sensors.

4. The apparatus of claim 1, the processor to dynamically transition between processing states during a time of transfer of the data frames of the data stream received from the first of the plurality of data producer sensors and during a time of transfer of the data frames of the data stream received from the second of the plurality of data producer sensors.

5. The apparatus of claim 1, wherein the processing states include a spilling state in which the read pointer is indexed to the local memory and the write pointer is indexed to a remote memory.

6. The apparatus of claim 5, wherein the processing states include a chasing state in which the read pointer is indexed to the remote memory and the write pointer is indexed to the remote memory.

7. The apparatus of claim 6, wherein the processing states include a reconnect state in which the read pointer is indexed to the remote memory and the write pointer is indexed to the local memory.

8. The apparatus of claim 1, comprising a read pointer and a write pointer, wherein the read pointer never underruns the write pointer, and wherein the write pointer never overruns the read pointer.

9. The apparatus of claim 1, wherein the plurality of data producer sensors comprise a plurality of camera sensors.

10. The apparatus of claim 1, wherein the one or more consumer comprises one or more displays.

11. At least one computer readable storage medium having instructions stored thereon, the instructions when executed on a processor, cause the processor to:
receive respective data streams provided from a plurality of data producer sensors;
stagger a time of triggering of a first of the plurality of data producer sensors relative to a time of triggering of a second of the plurality of data producer sensors to minimize a concurrency of data frames of the data stream received from the first of the plurality of data producer sensors and data frames of the data stream received from the second of the plurality of data producer sensors;
dynamically transition between the processing states during a time of transfer of the data frames of the data stream received from the first of the plurality of data producer sensor and during a time of transfer of the data frames of the data stream received from the second of the plurality of data producer sensors, wherein the processing states include an on-the-fly state in which a read pointer is indexed to a local memory and a write pointer is indexed to the local memory;
process the data streams from the plurality of data producer sensors in a time-shared manner; and
provide the processed data streams to one or more consumer of the processed data streams.

12. The at least one computer readable medium of claim 11, the instructions when executed on the processor, cause the processor to reduce read out times of data frames of the data stream received from the first of the plurality of data producer sensors and data frames of the data stream received from the second of the plurality of data producer sensors.

13. The at least one computer readable medium of claim 11, wherein the processing states include read and write access to the local memory and read and write access to a remote memory.

14. The at least one computer readable medium of claim 11, wherein the processing states include a spilling state in which the read pointer is indexed to the local memory and the write pointer is indexed to a remote memory.

15. The at least one computer readable medium of claim 14, wherein the processing states include a chasing state in which the read pointer is indexed to the remote memory and the write pointer is indexed to the remote memory.

16. The at least one computer readable medium of claim 15, wherein the processing states include a reconnect state in which the read pointer is indexed to the remote memory and the write pointer is indexed to the local memory.

17. A computing device for processing data streams, comprising:
storage to store instructions; and
a processor to execute the instructions to:
receive respective data streams provided from a plurality of data producer sensors;
process the data streams from the plurality of data producer sensors in a time-shared manner;
dynamically transition between processing states during a time of transfer of the data frames of the data stream received from a first of the plurality of data producer sensors and during a time of transfer of the data frames of the data stream received from the second of the plurality of data producer sensors, wherein the processing states include read and write access to a local memory and read and write access to a remote memory, and wherein the processing states include an on-the-fly state in which a read pointer is indexed to the local memory and a write pointer is indexed to the local memory; and
provide the processed data streams to one or more consumer of the processed data streams.

18. The computing device of claim 17, wherein the processing states include a spilling state in which the read pointer is indexed to the local memory and the write pointer is indexed to the remote memory.

19. The computing device of claim 18, wherein the processing states include a chasing state in which the read pointer is indexed to the remote memory and the write pointer is indexed to the remote memory.

20. The computing device of claim 19, wherein the processing states include a reconnect state in which the read pointer is indexed to the remote memory and the write pointer is indexed to the local memory.

21. At least one computer readable storage medium having instructions stored thereon, the instructions when executed on a processor, cause the processor to:
receive respective data streams provided from a plurality of data producer sensors;
process the data streams from the plurality of data producer sensors in a time-shared manner;

dynamically transition between processing states during a time of transfer of the data frames of the data stream received from a first of the plurality of data producer sensors and during a time of transfer of the data frames of the data stream received from the second of the plurality of data producer sensors, wherein the processing states include read and write access to a local memory and read and write access to a remote memory, and wherein the processing states include an on-the-fly state in which a read pointer is indexed to the local memory and a write pointer is indexed to the local memory; and provide the processed data streams to one or more consumer of the processed data streams.

22. The at least one computer readable medium of claim 21, wherein the processing states include a spilling state in which the read pointer is indexed to the local memory and the write pointer is indexed to the remote memory.

23. The at least one computer readable medium of claim 22, wherein the processing states include a chasing state in which the read pointer is indexed to the remote memory and the write pointer is indexed to the remote memory.

* * * * *